United States Patent [19]

Knipp

[11] Patent Number: 4,467,389

[45] Date of Patent: Aug. 21, 1984

[54] MAGNETIC TAPE DEGAUSSER AND METHOD OF ERASING MAGNETIC RECORDING TAPE

[75] Inventor: Roger W. Knipp, Fountain Valley, Calif.

[73] Assignee: Christie Electric Corp., Torrance, Calif.

[21] Appl. No.: 362,470

[22] Filed: Mar. 26, 1982

[51] Int. Cl.$^3$ ............................................. H01F 13/00
[52] U.S. Cl. ..................................................... 361/151
[58] Field of Search ................................. 361/149, 151

[56] References Cited

U.S. PATENT DOCUMENTS

| | | | |
|---|---|---|---|
| 2,848,660 | 8/1958 | Boyers | 361/151 |
| 3,023,280 | 2/1962 | Tronslin et al. | 361/151 |

Primary Examiner—Harry E. Moose, Jr.
Attorney, Agent, or Firm—Harris, Kern, Wallen & Tinsley

[57] ABSTRACT

A magnetic tape degausser includes a pair of electromagnets which are arranged to project a magnetic field through a magnetic tape reel to magnetically erase the magnetic tape. The magnetic tape degausser includes improvements in the control of the motorized transport mechanism used to control the movement of a tape reel in rotation towards and away from erasing electromagnets. Excitation of the electromagnets is synchronized with the operation of the transport mechanism in a cooperative fashion so that the electromagnets are actuated when the magnetic tape is near the electromagnets and as the magnetic tape is withdrawn from the electromagnets. An alternative version exposes the magnetic tape to a non-uniform field as the tape approaches the electromagnets, and a uniform field as the tape is withdrawn. The speed at which the magnetic tape reel is transported away from the electromagnets is controlled so as to ensure adequate, but noise-free erasure. An improved tape height sensor is provided which serves to prevent damage to the magnetic tape reel from contact with the electromagnets, and further serves to detect when the magnetic tape reel is pulled out of place by the electromagnets.

5 Claims, 21 Drawing Figures

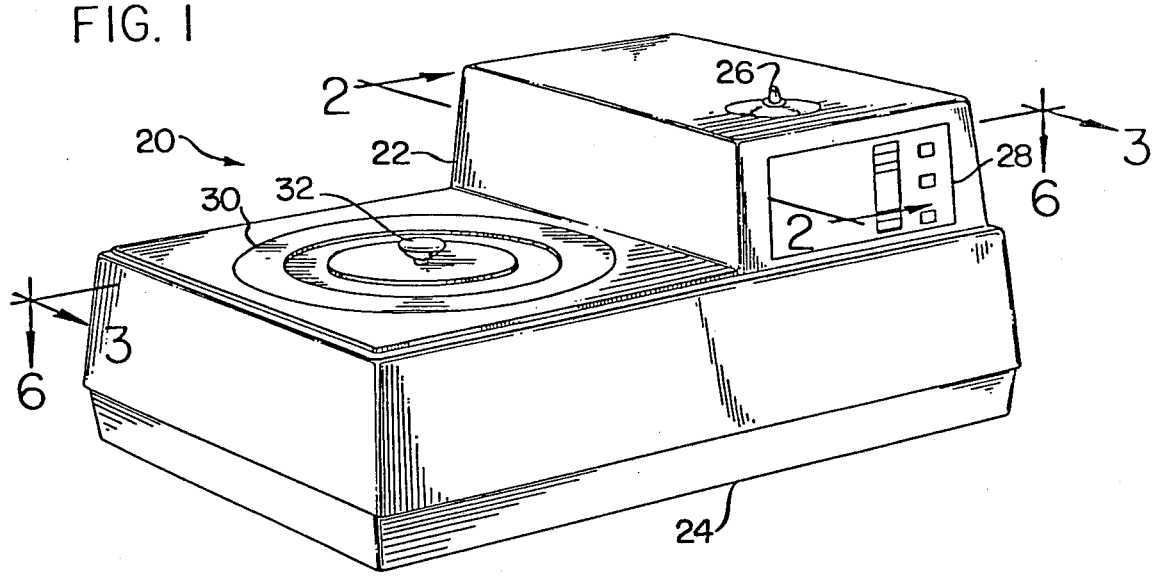
FIG. 1
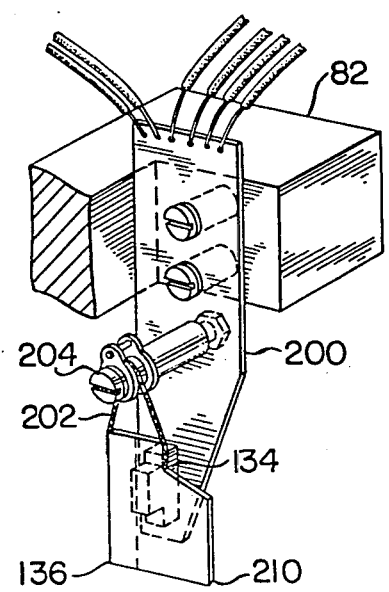
FIG. 7
FIG. 8
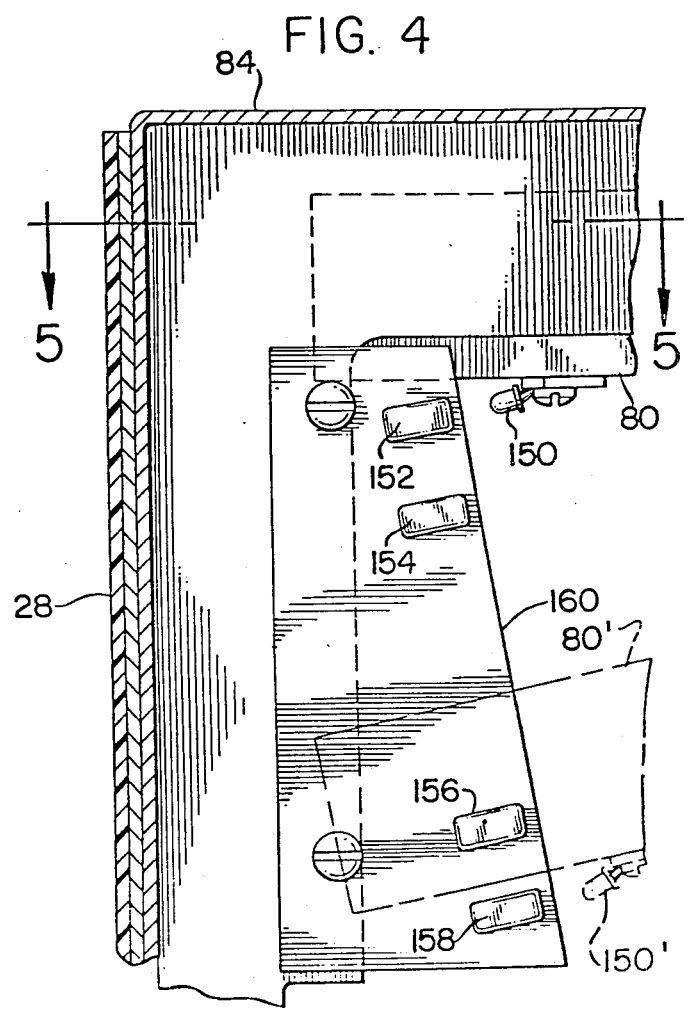
FIG. 4

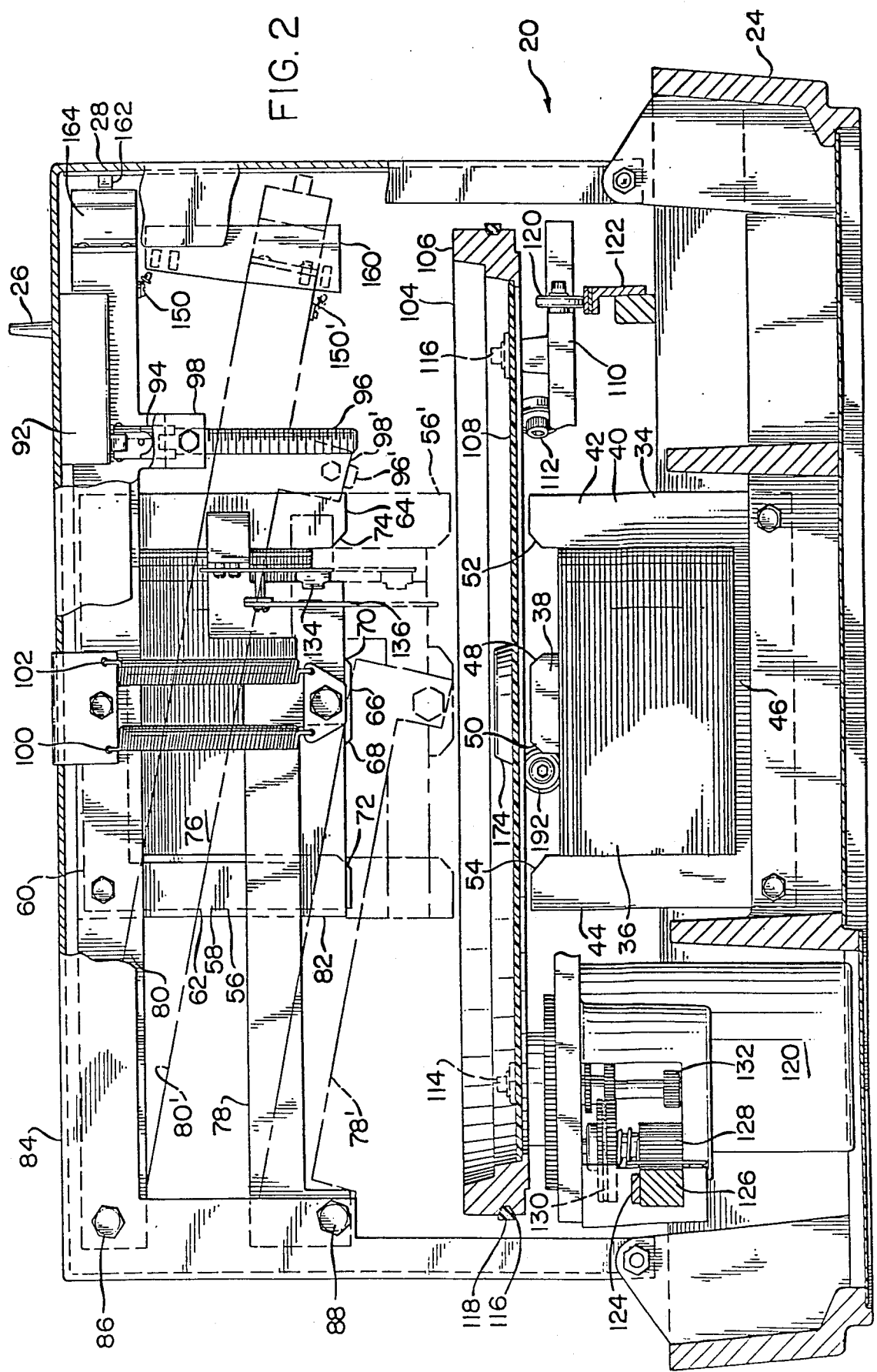

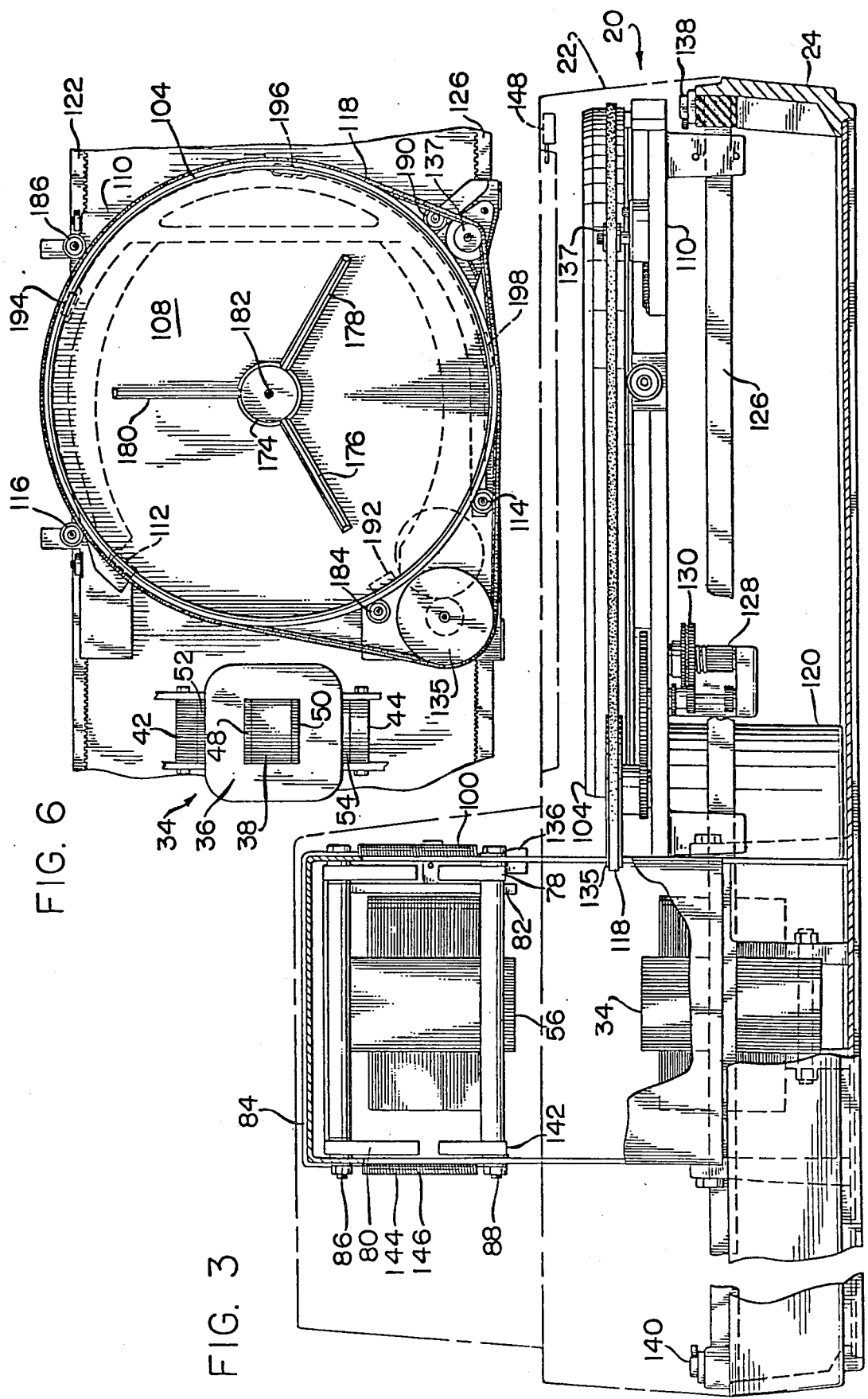

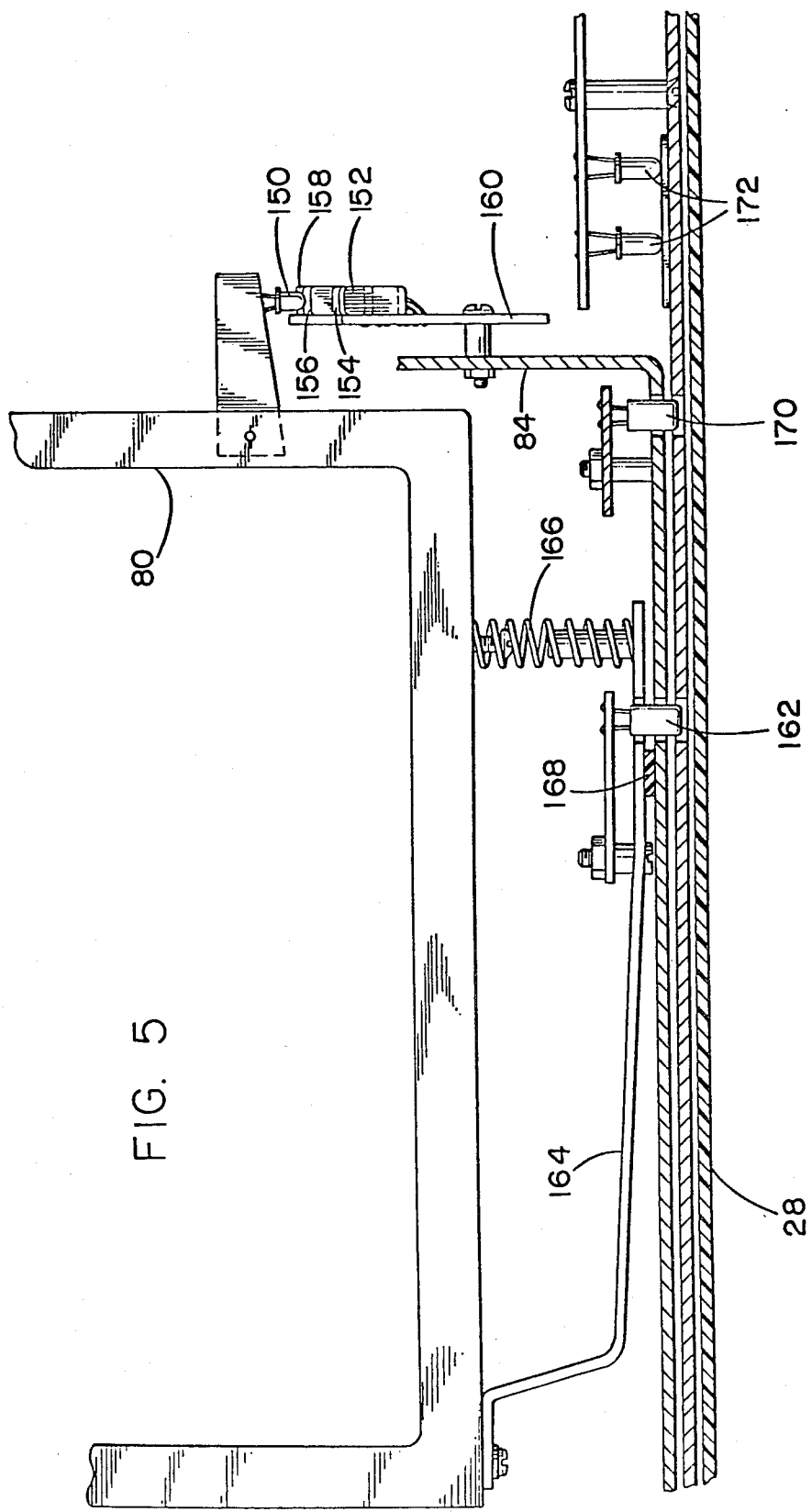

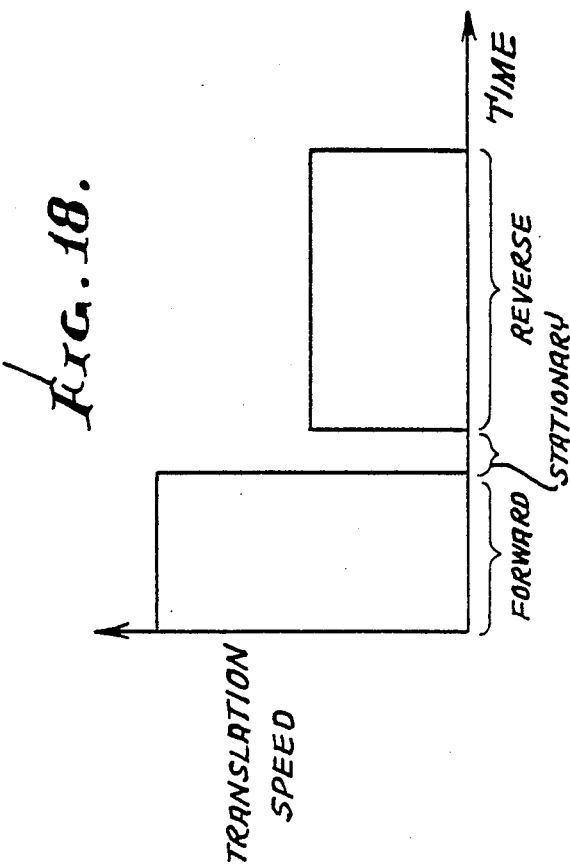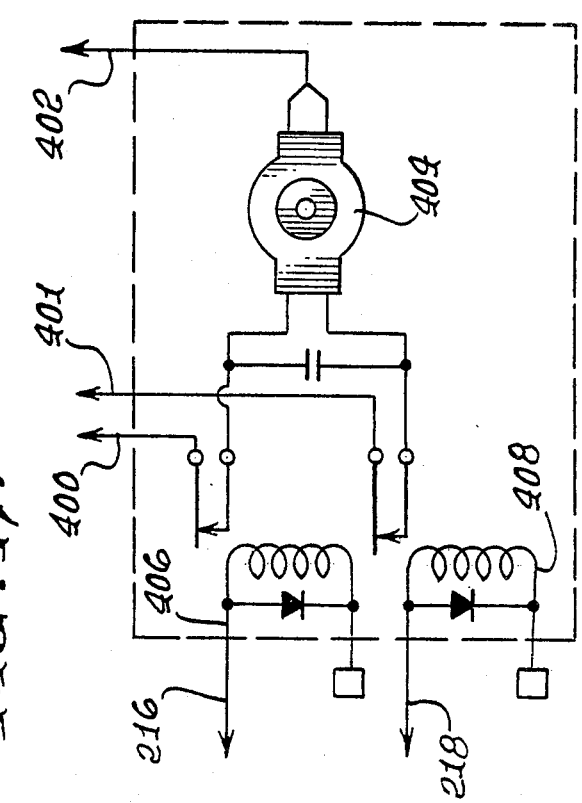

MAGNETIC TAPE DEGAUSSER AND METHOD OF ERASING MAGNETIC RECORDING TAPE

CROSS-REFERENCE TO RELATED APPLICATIONS

A U.S. patent application entitled "Magnetic Tape Degausser and Method of Erasing Magnetic Recording Tape" was filed in the U.S. Patent and Trademark Office on Jan. 7, 1981 on behalf of applicants John S. Baumann, Roger W. Knipp, and Joseph J. Kacin, and was accorded application Ser. No. 223,142.

FIELD OF THE INVENTION

This invention relates generally to electrical devices for degaussing or erasing magnetic recording tapes, and pertains more particularly to such systems using electromagnets and structures to move the tape with respect to the electromagnets, so that the speed of withdrawal of the tapes from the electromagnets is controlled in response to the position of the tape with respect to the electromagnets, so that the tapes are uniformly erased to a low noise level, and so that possibly damaging contact between the electromagnets and the tape is avoided.

BACKGROUND OF THE INVENTION

In a prior patent application (the U.S. Patent application Ser. No. 223,142 listed above), an electro-mechanical magnetic tape degausser was described, in which a transport mechanism was provided in order to automatically convey magnetic tape reels towards, between, and away from a pair of electromagnets. The device described in the above-mentioned application also included a tape height sensor which was used to prevent damaging contact between the magnetic tape reels and the electromagnets as the reels were conveyed towards the electromagnets by the transport mechanism.

Many types of devices are known in the prior art for erasing magnetic recording tapes. One example is U.S. Pat. No. 2,826,643 to Bruce Greiner, which discloses a method of erasing magnetic tapes by placing the tape between two demagnetizing coils, which are connected in parallel. That patent discloses the use of a threaded rod having a handwheel for moving the two coils towards and away from each other in order to accommodate recording tape of differing widths. That patent also discloses the use of a motor in combination with a roller for use in rotating a magnetic tape roll by contacting the roll on its outer circumference.

Another example of a prior art tape degausser is Rettinger U.S. Pat. No. 2,730,570, which shows the use of a pair of oppositely mounted "E" shaped magnetic cores for erasing a length of magnetic tape. From FIG. 2 of that patent, it appears that the sections of the magnetic cores have slightly narrowed tips.

The major purpose of bulk magnetic tape eraser or degausser machines is to effectively remove information which has been magnetically encoded onto magnetically sensitive tape which is stored on reels, cassettes, or some other form of cartridge or container. It is desirable that such tape may be erased quickly in bulk, while it is still on the reel or cartridge in which it is normally stored. For example, it is desirable that reels of magnetic video tape for television use can be quickly erased and reused to record new video signals without encountering any latent remains of previously recorded video signals. Such tape erasers are valuable for use in erasing video tapes, audio tapes, and computer tapes.

It is desirable that magnetic tape erasers be capable of erasing tapes stored on the large variety of reels, cassettes, and cannisters which are in commercial use without removing the tape from its container. It is also desirable that magnetic tape erasers be capable of adequately and fully erasing modern high-coercivity tapes made using chromium or other metals. Because of higher recent performance standards for magnetic recording tapes, it is important that magnetic tape erasers make as complete as possible an erasure of information encoded on a tape so as to prevent remnant information of prior recording from contaminating later recordings.

A problem with prior magnetic tape erasers is that, when high-strength magnetic fields are passed through the magnetic tape reels in order to fully erase high-coercivity magnetic tapes, extensive heat buildup is produced in metallic reel materials (as distinguished from the magnetic tape materials themselves) so that the time during which the magnetic field may be applied is limited by the temperature resistance of the material used in the tapes. Another problem with prior tape erasers is that the tapes and their containers may be damaged during the erasing process if the tapes are picked up, moved about or forced into contact with the electromagnets due to the influence of the high magnetic field used for erasing. Such contact with the electromagnets may damage the tape containers or the electromagnets themselves. Another problem encountered is that residual noise may be left in the tapes after erasure, due to reduced strength of the erasing field at the center of the tape width. A further problem with prior magnetic tape erasers is that residual noise may be produced in the tapes which have undergone the erasure process, and where such noise is not directly related to the operation of the electromagnets used for erasing.

SUMMARY OF THE INVENTION

Accordingly, it is an object of this invention to provide a bulk magnetic recording tape degausser or eraser for erasing information magnetically encoded on recording tapes.

This invention involves a magnetic tape erasing system which includes a pair of electromagnets mounted one above the other with the upper electromagnet being manually, vertically adjustable with respect to the lower electromagnet so as to provide adequate clearance for and a tight fit for various sizes of magnetic tape containers. The electromagnets are "E" shaped and have vertically opposing polarity pole pieces with notched ends to promote a strong vertical magnetic erasing field flux. The electromagnet winding coils are electrically connected in parallel with capacitors to form tuned inductance-capacitance tank circuits resonant at the power line frequency to provide a large magnetic erasing field flux without undue power drain or large voltage requirements. A rotating tape tray is provided for supporting the tape to be erased and for conveying the tape towards and away from between the electromagnets. A tape height sensor is provided to restrict the lateral movement of the tape when the separation between the electromagnets is not adequate and thus to prevent physical damage to the tape and to the tape eraser machine itself. The tape height sensor also serves to detect when the magnetic tape has been lifted upwards by the erasing field, so that when such lifting occurs, the electromagnets are automatically turned off and the tape withdrawn from between the electromagnets.

The improvements to magnetic tape erasing described herein allow the more selective application of magnetic fields so that extensive heat buildup is avoided in the magnetic tapes to be erased. That is, in one of the versions described herein, the erasing magnetic fields are not applied as the magnetic tape reel is brought towards the electromagnets, but is selectively applied only when the magnetic tape reel is between the electromagnets and as the magnetic tape is moved away from the electromagnets. An alternative version causes only one of the electromagnets to be activated as the tape reel is brought towards the electromagnets so that complete, uniform erasure is ensured. This invention also provides an improvement in controlling the rate of speed at which the magnetic tapes are moved away from the electromagnets so that the frequency of undesired residual noise is kept low, and so that the amplitude of undesired residual noise is also kept low. The invention may use a controlled AC motor which is caused to transport the magnetic tape towards the electromagnets at a high rate of speed, and away from the electromagnets at a low rate of speed. The invention may also use a DC motor in which a magnetic tape reel is moved into a position between the degaussing coils at a high rate of speed, and is withdrawn from between the degaussing coils at a low rate of speed which is decreased as the tape is removed from between the degaussing coils.

These and other advantages of this invention will appear more fully from the following description made in conjunction with accompanying drawings wherein like reference characters refer to the same or similar parts throughout the several views.

DESCRIPTION OF THE DRAWINGS

FIG. 1 is a front perspective view of the magnetic tape degausser of this invention.

FIG. 2 is a partially cut-away sectional view of the magnetic tape degausser of FIG. 1 taken along the line 2—2 thereof and showing, in phantom, a lowered position of the upper electromagnet and parallellogram linkage.

FIG. 3 is a partially cut-away sectional view of the magnetic tape degausser of FIG. 1 taken along the line 3—3 thereof and showing, in phantom, the cover shroud and tape tray cover.

FIG. 4 is a partially cut-away side sectional view of a portion of the magnetic tape degausser of this invention showing the standard magnet separation circuit board and light source, and further showing, in phantom, a lowered position of the parallelogram linkage.

FIG. 5 is a partially cut-away top sectional view of a portion of the magnetic tape degausser of FIG. 4 taken along the line 5—5 thereof.

FIG. 6 is a partially cut-away top sectional view of a portion of the magnetic tape degausser of FIG. 1 taken along the line 6—6 thereof.

FIG. 7 is a partially cut-away side perspective view of a portion of the parallelogram linkage of this invention showing the tape height sensor mounted thereon.

FIG. 8 is a side view of the tape height sensor pivoting flap of this invention.

FIG. 17 is an improved portion of AC circuitry for use with the tray rotation and translation control circuitry of this invention.

FIG. 18 is a translation speed versus time graph showing the performance produced through use of the circuitry shown in FIGS. 14 and 17.

DESCRIPTION OF THE PREFERRED EMBODIMENT

Figure 9:
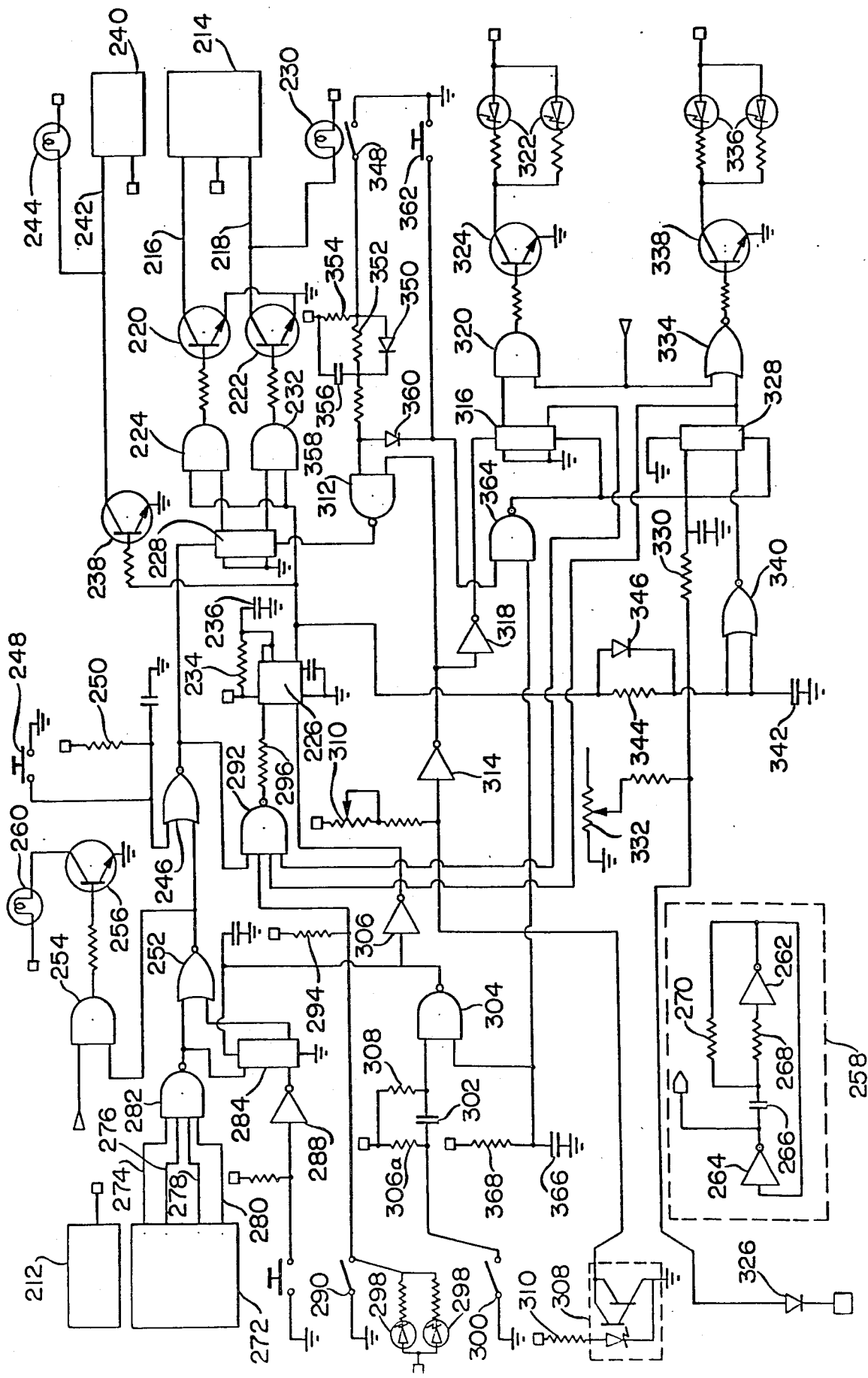
FIG. 9 is an electrical schematic circuit diagram of the logic portions of the electronic circuitry of this invention.

The description presented below relating to FIGS. 1–12 relates to the device and method of U.S. Patent application Ser. No. 223,142 mentioned above. The section below entitled "Improvements" and commencing with the description of FIG. 13 relates to improvements presented herein.

Referring first to FIG. 1, the magnetic tape degausser 20 has a top cover shroud 22 mounted on a base plate casting 24. A manually rotatable crank knob 26 projects from the cover shroud 22 to allow the user of the degausser 20 to manually take adjustments to accommodate various physical thicknesses and sizes of magnetic recording tape and tape reels or containers.

A display panel 28 is mounted on the front of degausser 20 and has indicators to display the physical and electrical status of degausser 20 and has control switches mounted thereon to control the operation of degausser 20. It is preferable that display panel 28 comprise a translucent sheet of plastic material which allows indicator lights to shine therethrough and which may be readily labeled with printed test which becomes visible when light is projected through panel 28.

Removable tape tray cover 30 fits onto cover shroud 22 and provides access to the inside of degausser 20 for the insertion of magnetic recording tapes to be erased. Tape tray cover 30 is a generally circular disk having a cover knob 32 allowing the cover 30 to be easily manually lifted by the user of degausser 20.

Referring next to FIG. 2, lower electromagnet 34 is securely attached to and mounted on base plate casting 24. Electromagnet 34 has a wire coil winding 36 wound around a center pole piece 38 of an "E" shaped electromagnet core 40. Electromagnet core 40 is composed of interleaved laminations of standard, commercially available, iron transformer core material of the type customarily used in fabricating choke and transformer cores and the like. Electromagnet core 40 has edge pole pieces 42 and 44 which are mounted on opposite sides of electromagnet 34 on the periphery of coil 36 and are mounted parallel to center pole piece 38. Pole pieces 38, 42, and 44 project vertically upwards from horizontal piece 46 which mechanically and magnetically connects pole pieces 38, 42 and 44 and which is a part of electromagnet core 40.

Center pole piece 38 has notches 48 and 50 cut in the upper, side edges thereof. Similarly, edge pole piece 42 has a notch 52 placed in the upper, side edge thereof which faces center pole piece 38. Notches 48 and 52 are placed in pole pieces 38 and 42, respectively, as inwardly sloping beveled or rounded edges which face each other so as to increase the magnetic coupling between pole pieces 38 and 42; thus reducing the horizontal magnetic impedance and reduce the magnetic coupling between pole pieces 38 and 42; thus reducing the horizontal magnetic flux between pole pieces 38 and 42 when lower electromagnet 34 is in operation. Notches 48 and 52 also serve to increase the vertical magnetic flux from lower electromagnet 34 and serve to increase the magnetic field strength in the upper ends of pole pieces 38 and 42. Notches 48 and 52 thus act to concentrate the vertical magnetic flux and act to inhibit horizontal magnetic flux from lower electromagnet 34. Notches 48 and 52 accomplish such results by reducing the horizontal surface area of the ends of pole pieces 38 and 42 and by reducing the amount of metal in the horizontal path between the ends of pole pieces 38 and 42 so as to increase the magnetic impedance therebetween. Notches 48 and 52 promote the effective and efficient erasing of recording tape by magnetic tape degausser 20 by encouraging a large and high intensity vertical magnetic flux.

Edge pole piece 44 has a notch 54 placed in the upper, side edge thereof which faces center pole piece 38. Notches 50 and 54 are placed in pole pieces 38 and 44, respectively, as inwardly sloping beveled or rounded edges which face each other so as to co-act and cooperate with each other in substantially the same way as notches 48 and 52 function, as described above. Notches 50 and 54 serve to further increase the vertical magnetic flux and also serve to increase the magnetic field intensity at the upper ends of pole pieces 38 and 44.

Upper electromagnet 56 is substantially identical in construction to lower electromagnet 34 and has an "E" shaped electromagnet core 58 with a core piece 60 mounted horizontally, and the edge pole pieces 62 and 64 and center pole piece 66 projecting vertically downwards from core piece 60. Center pole piece 66 has notches 68 and 70 placed therein. Edge pole pieces 62 and 64 have notches 72 and 74, respectively, placed therein. Notches 72, 68, 70, and 74 serve the same purposes, functions, and objectives as described above with reference to notches 54, 50, 48, and 52.

Center pole piece 66 is in approximate vertical alignment with center pole piece 38 and wire coil winding 76 is wound on center pole piece 66 to provide a magnetic field in phase with the magnetic field generated by coil winding 36. Windings 36 and 76 cause center pole pieces 38 and 66 to be at opposite magnetic polarities so that magnetic flux is promoted vertically between center pole pieces 38 and 66 and so that a vertically directed magnetic field results between electromagnets 34 and 56. The "E" shaped electromagnet core 40 causes edge pole pieces 42 and 44 to have a magnetic polarity (North or South polarity) which is opposite to the magnetic polarity of center pole piece 38. Since the center pole piece 38 is at opposite magnetic polarity to the edge pole pieces 42 and 44, there is some tendency for magnetic flux to flow between the center pole piece 38 and the edge pole pieces 42 and 44; and this tendency is resisted by notches 54, 50, 48, and 52.

The "E" shaped electromagnet core 58 causes edge pole pieces 62 and 64 to have a magnetic polarity which is opposite to the magnetic polarity of center pole piece 66. Since the center pole piece 66 is at an opposite magnetic polarity to the edge pole pieces 62 and 64, there is some tendency for magnetic flux to flow between the center pole piece 66 and the edge pole pieces 62 and 64; and this tendency is resisted by notches 72, 68, 70, and 74. Thus, edge pole pieces 44 and 62 are at opposite magnetic polarities so that magnetic flux is promoted vertically between pole pieces 44 and 62 and so that a vertically directed magnetic field results between electromagnets 34 and 56. Also, edge pole pieces 42 and 64 are at opposite magnetic polarities so that magnetic flux is promoted vertically between pole pieces 42 and 64 and so that a vertically directed magnetic field results between electromagnets 34 and 56. Therefore, the magnetic flux flow direction and magnetic field direction between center pole pieces 38 and 66 are opposite to the magnetic flux flow direction and magnetic field direction between the pairs of edge pole pieces 44 and 62, and 42 and 64.

Upper electromagnet 56 is mechanically suspended from a parallelogram linkage consisting of link 78 and link frame 80 which are pivotally bolted to upper electromagnet 56 through a "G" shaped support bracket 82 which is securely mounted on upper electromagnet 56. Link 78 and link frame 80 are pivotally bolted to upper housing 84 by means of bolts 88 and 86, respectively. Upper housing 84 is securely mounted on base plate casting 24. Link 78 is pivotally bolted to support bracket 82 by means of bolt 90. The distance between bolts 88 and 90 is the same as the distance between bolt 86 and a bolt (not shown) pivotally connecting link frame 80 with support bracket 82. Thus, link 78 and link frame 80 form a parallelogram linkage allowing upper electromagnet 56 to be moved upwards and downwards vertically with respect to base place casting 24, and further insuring that upper electromagnet 56 remains upright and is prevented from tilting as it is moved up and down. It is important that upper electromagnet 56 be prevented from tilting so that the lower surface of upper electromagnet 56 defined by the lower ends of pole pieces 64, 66, and 62 remains horizontal thus allowing a magnetic tape (not shown) to be erased to closely approach the lower surface of upper electromagnet 56. Manually rotatable crank knob 26 is connected through a gear box 92, a universal joint 94, and a leadscrew 96 to a threaded connector 98 on link frame 80. As leadscrew 96 is rotated, link frame 80 is vertically moved by threaded connector 98 crank knob 26, gearbox 92, universal joint 94, and leadscrew 96 are supported by upper housing 84. Universal joint 94 allows leadscrew 96 to swing vertically to accommodate the horizontal motion of threaded connector 98 as link frame 80 is vertically moved. Rotation of crank knob 26 causes the activation of gearbox 92, rotation of universal joint 94, rotation of leadscrew 96 which is engaged with threaded connector 98, and vertical movement of link frame 80. Thus, link frame 80 and upper electromagnet 56 may be moved vertically upwards and downwards by a user of magnetic tape degausser 20 who manually rotates crank knob 26. The mechanical advantage provided by leadscrew 96 allows upper electromagnet 56 to be precisely positioned in a stable vertical position determined by the user of magnetic tape degausser 20. Upper electromagnet 56 is shown in phantom in a vertically lowered position as 56'. Similarly, link 78 and link frame 80 are shown in phantom as 78' and 80' corresponding to their position relative to upper electromagnet 56'. When the upper electromagnet 56 is lowered to the position 56', the leadscrew 96 pivots to 96' to accommodate the horizontal translation of the threaded connector 98 which moves to 98'. Note that upper electromagnet 56 does not become tilted as it moves from 56 to 56' but vertically lowers and shifts slightly horizontally.

A pair of helical coil springs 100 and 102 are mounted between bolt 90 and upper housing 84 to counterbalance the weight of upper electromagnet 56 and allow rotation of crank knob 26 without undue manual effort.

Rotatable circular tape tray 104 has a circular metallic ring-like rim 106 placed around the periphery of a thin, non-metallic bottom disk 108 which is preferably composed of the type of fiberglass reinforced sheet material typically used for the commercial fabrication of printed circuit boards. Disk 108 is preferably thin and preferably does not impede magnetic fields so that a recording tape (not shown) to be erased which is placed on disk 108 may be readily magnetically erased by electromagnets 34 and 56. Rim 106 vertically supports disk 108 and allows disk 108 to be rotated and moved horizontally. Tape tray 104 holds the recording tape (not shown) to be erased and is mounted to be slightly vertically above electromagnet 34 and to slide between electromagnets 34 and 56.

Tape tray 104 is supported vertically by a plurality of vertical rollers mounted on a carriage 110 to make rolling contact with the underside of rim 106, as exemplified by vertical roller 112. Tape tray 104 is constrained to rotate in a horizontal plane on carriage 110 by a plurality of horizontal rollers mounted on carriage 110 to make rolling contact with the outside periphery of rim 106, as exemplified by horizontal rollers 114 and 116.

Tape tray 104 has an annular slot 116 in the outside periphery of rim 106 to accommodate a V-belt 118 which serves to impart rotation to tape tray 104. Electric motor 120 is connected to drive V-belt 118 and thus rotate tape tray 104. This method of edge-driving tape tray 104 by a V-belt 118 is particularly advantageous in the operation of degausser 20 since no drive components need come between electromagnets 34 and 56 to reduce the magnetic field therebetween, and electromagnets 34 and 56 are allowed to closely, physically approach the recording tape (not shown) to be degaussed so as to insure complete and effective magnetic erasure.

Carriage 110 is mounted for sliding horizontal movement with respect to base plate casting 24 by carriage roller 120 which is secured to carriage 110 and which makes rolling contact with tract 122 on base plate casting 24. Carriage 110 is also supported by bearing plate 124 which is secured to carriage 110 and which makes rolling contact with tract 122 on base plate casting 24. Carriage 110 is also supported by bearing plate 124 which is secured to carriage 110 and which makes sliding contact with the upper surface of rack 126. Rack 126 is attached to and extends along the length of base plate casting 24 and serves to confine carriage 110 to unidirectional horizontal motion by carriage 110.

Pinion gear 128 meshes with rack 126 and is connected through slip clutch 130 and drive train 132 to electric motor 120. As pinion gear 128 is rotated, carriage 110 is caused to translate horizontally along rack 126. Motor 120, slip clutch 130, drive train 132, and pinion gear 128 are all mounted on carriage 110 and thus move with carriage 110 as it horizontally translates. Therefore, the rotation of motor 120 causes both rotation of tape tray 104 and horizontal translation of tape tray 104.

A tape height sensor pivoting flap 136 is pivotably mounted on support bracket 82 in front of photoreflective sensor 134 to detect when upper electromagnet 56 is physically positioned too low. Pivoting flap 136 hangs vertically below upper electromagnet 56 so as to physically contact a recording tape container (not shown) placed on tape tray 104; when the recording tape container is too large to fit underneath upper electromagnet 56. The function of photoreflective sensor 134 is to detect movement of flap 136 caused by contact with a recording tape container (not shown). When photoreflective sensor 134 detects movement of flap 136, then motion of the recording tape container (not shown) towards upper electromagnet 56 is prevented and physical damage to upper electromagnet 56 and/or the recording tape container is avoided.

Referring next to FIG. 3, drive pulley 135 is mounted on motor 120 to drive V-belt 118 and rotate tape tray 104. Tape tension pully 137 is mounted on carriage 110, contacts V-belt 118, and is adjustable to maintain tension in V-belt 118. Front microswitch 138 is mounted on base plate casting 24 to make contact with and sense when carriage 110 has slid hoizontally to its full forward position. Rear microswitch 140 is mounted on base plate casting 24 to make contact with and sense when carriage 110 has slid horizontally to its full rearward position.

Clutch 130 slips carriage 110 is in its full rearward position and tape tray 140 is between electromagnets 34 and 56 so that tape tray 104 is allowed to rotate while remaining in the same horizontal position. It is important that tape tray 104 be allowed to rotate while in place between electromagnets 34 and 56 so that magnetic recording tape (not shown) in tape tray 104 is fully exposed to the erasing magnetic flux between electromagnets 34 and 56.

Pivoting flap 136 is positioned below and in front of upper electromagnet 56 so as to come into contact with tape containers (not shown) on tape tray 104 before such containers make contact with the upper electromagnet 56. As described above, pivoting flap 136 functions as a tape height sensor to preventing destructive contact between a tape container (not shown) and the upper electromagnet 56.

Link 142 is similar in shape to link 78 and is pivotably mounted to upper electromagnet 56 on the side opposite link 78. Link arm 80 extends around upper electromagnet 56 and forms a parallelogram linkage with link 142 to pivotably support upper electromagnet 56 on upper housing 84. A pair of springs 144 and 146 similar to springs 100 and 102 are mounted adjacent link 142 to perform the same counter balancing function performed by springs 100 and 102.

Cover detector microswitch 148 is mounted on cover shroud 22 to detect when tray cover 30 (see FIG. 1) is in place. In order to protect the user of degausser 20 from physical injury, it is desirable to prevent degausser 20 from operating when cover 30 is not in place so that the user's hands don't become entangled with the moving tape tray 104.

Referring next to FIG. 4, standard magnet separation light source 150 is preferably a light emitting diode attached to link arm 80 and which moves up and down vertically with link arm 80. Light source 150 is shown in a lower position 140 corresponding to the lowered position 80 of link arm 80 as described in connection with FIG. 2 herein. Light source 150 is positioned to project light into successive light sensors 152, 154, 156, and 158 as link arm 80 is moved up and down. Light sensors 152, 154, 156 and 158 are preferably light sensitive resistors mounted on standard magnet separation circuit board 160 in order to intercept light projected by light source 150. Circuit board 160 is securely mounted on upper housing 84 and light sensors 152, 154, 156 and 158 are stationary with respect to upper housing 84.

The function of light sensors 152, 154, 156 and 158 is to cooperate with light source 150 to detect the vertical position of upper electromagnet 56 by detecting the position of link arm 80. Light sensors 152, 154, 156 and light source 162 physically close to panel 28 as link arm 80 is horizontally displaced due to vertical movement of link arm 80 by spring-biasing source 162 towards panel 28. It is desirable that light source 162 be maintained physically close to panel 28 so that light emitted by light source 162 is clearly visible to the user of degausser 20 and so that the vertical position of upper electromaget 56 may be readily determined by observing panel 28.

The vertical position of light source 162 may be used to decide how to manually adjust crank knob 26 to achieve a desired vertical position for upper electromagnet 56. Also, the vertical position of light source 162 may be used to determine when crank knob 26 has been properly adjusted so that upper electromagnet 56 has been vertically positioned to accommodate a tape container having a size not corresponding to the "standard" sizes detected by light sensors 152, 154, 156 or 158.

Light sources 170 are preferably light emitting diodes and are positioned behind panel 28 so as to project light through panel 28. Sources 170 consist of four light sources associated with sensors 152, 154, 156 and 158 and arranged in a vertical row to light in response to the detection of light from light source 150 by the corresponding sensor 152, 154, 156 or 158. The function of light source 170 is to provide a visual indication to the user of degausser 20 to signal when crank knob 26 has been properly adjusted so as to place upper electromagnet 56 at a "standard" vertical position.

Light sources 172 are preferably light emitting diodes positioned behind panel 28 to shine through panel 28 to display printed text on panel 28 information concerning the status thereof.

Referring next to FIG. 6, tape tray 104 is provided with a removable hub 174 and separator bars 176, 178 and 180 which are removably mounted to bottom disk 108 by means of mounting screw 182 which threads into disk 108. The function of separator bars 176, 178 and 180 is to prevent magnetic tape cassettes (not shown) and small tape reels (not shown) from moving around on the surface of disk 108 when degausser 20 is operated, thus insuring that the tape on such cassettes and reels is completely and uniformly erased. The function of hub 174 is to hold bars 176, 178 and 180 down in place when such bars are needed, and to allow the bars to be removed from disk 108 when not needed.

Horizontal rollers 114, 116, 184, 186 and 190 are horizontally mounted on carriage 110 and make rolling contact with the outside periphery of the tape tray 104, thus allowing tape tray 104 to rotate but preventing tape tray 104 from translating horizontally on carriage 110.

Vertical rollers 112, 192, 194, 196 and 198 are vertically mounted on carriage 110 and make rolling contact with the underside of tape tray 104 near the periphery thereof, thus providing vertical support for tape tray 104 and allowing tape tray 104 to rotate.

Lower electromagnet 34 is positioned to lie in the path of tape tray 104 as tray 104 and carriage 110 move horizontally on rack 126 and track 122. As tape tray 104 rotates and passes over lower electromagnet 34, magnetic flux emanating from pole pieces 42, 44 and 38 sweeps over the area encompassed by disk 108.

Referring next to FIG. 7, photoreflective sensor 134 is mounted on tape height sensor circuit board 200 which is attached to support bracket 82. Photoreflective sensor 134 preferably comprises a light emitting diode and photo-darlington transistor light received combined together in a commercially available component part, and which senses the optical reflectance of items placed in front of sensor 134.

Pivoting flap 136 is placed in front of sensor 134 and is attached to circuit board 200 by means of a flexible length of string 202 which is looped over a post 204 attached to circuit board 200. String 202 allows flap 136 to pivot and move freely upwards and in all horizontal directions. It is desirable that flap 136 be capable of free upwards and horizontal movement since, because of the rotation of tape tray 104, a magnetic tape container (not shown) placed on tape tray 104 may approach and contact flap 136 from differing directions which are related to the relative position of tape container on the disk 108. It is desirable that flap 136 not be physically damaged by contact with a magnetic tape container (not shown).

Referring next to FIG. 8, the side of flap 136 which faced photoreflective sensor 134 has a white colored stripe 206 placed vertically down one end thereof. The remaining area 208 of flap 136 is colored black to have a low optical reflectivity. The stripe 206 has a high optical reflectivity. When flap 136 is placed in front of sensor 134; stripe 206 is positioned in front of sensor 134 unless a magnetic tape container (not shown) contacts flap 136 so as to place area 208 in front of sensor 134, or so as to move stripe 206 from the front of sensor 134 and change the optical reflectance presented in sensor 134. Thus, a magnetic tape container (not shown) striking flap 136 causes a change in optical reflectance which is detected by sensor 134.

Flap 136 is equipped with a forwardly protruding lobe 210 which protrudes in front of circuit board 200 and upper electromagnet 56 to insure that magnetic tape containers (not shown) will strike flap 136 and be detected by sensor 134 prior to striking upper electromagnet 56 and causing physical damage.

Referring next to FIG. 9, power supply 212 provides direct current power to all circuit nodes in FIGS. 9, 10, 11 and 12 which are marked with a small open square. Supply 212 preferably provides a positive twelve volt power for the operation of the logic integrated circuit gates, timers, and flip-flops.

Tray translation and rotation control circuit 214 is connected by leads 216 and 218 to the collectors of transistors 220 and 222, respectively. When transistor 220 is turned "On", motor 120 is activated so that tape tray 104 rotates and moves towards electromagnets 34 and 56. When transistor 222 is "On", motor 120 is activated so that tape tray 104 rotates and moves away from electromagnets 34 and 56, lamp 230 lights to indicate on panel 28 that the tray 104 is moving in a reverse direction.

AND gate 224 has its output connected through a resistor to the base of transistor 220, and another input connected to the non-inverted output of flip-flop 228. AND gate 232 has its output connected through a resistor to the base of transistor 222, one input connected to the output of timer 226, and another input connected to the inverted output of flip-flop 228. When AND gate 224 is "On" then transistor 220 is turned "On", and when AND gate 232 is "On" then transistor 222 is turned "On". Flip-flop 228 prevents both gates 224 and 232 from being "On" at the same time and acts to select which of gates 224 or 232 is allowed to turn "On".

Timer 226 is preferably a commercially available, general purpose timer integrated circuit of the type denoted LM555, and which is connected to resistor 234 and capacitor 236 to act as a monostable latch having a time period of approximately fifty seconds. The output of timer 226 is connected through a resistor to the base of transistor 238 so that when timer 226 is "On", transistor 238 is turned "On", and electromagnet drive circuit 240 is activated through lead 242 connected to the collector of transistor 238 to provide electromagnets 34 and 56 with electrical power. Lamp 244 is connected to the collector of transistor 238 and is caused to light when transistor 238 turns "On" thus indicating visually on panel 28 that electromagnets 34 and 56 are supplied with electrical power.

Timer 226 functions to turn the electromagnets 34 and 56 on for a maximum of approximately fifty seconds and to allow motor 120 to run for a maximum of fifty seconds thus providing a safeguard timer circuit to shut down the operation of degausser 20 if too much time elapses (more than approximately fifty seconds) during the tape erasing operating cycle as when a tape reel (not shown) becomes physically stuck between the electromagnets 34 and 56 or when the degausser 20 malfunctions.

NOR gate 246 has its output connected to the set input of flip-flop 228 so that when gate 246 goes "On", gate 224 is not inhibited from going "On" and gate 232 is inhibited from going "On". Push button switch 248 is connected between one input of gate 246 and ground and, when depressed, serves as a "start" button and pulls down the input to gate 246 which is held high through resistor 250.

NOR gate 252 has its output connected to an input of gate 246 and also is connected to an input of AND gate 254. The output of gate 254 is connected through a resistor to the base of transistor 256. Blink source circuit 258 has its output connected to an input of gate 254. Lamp 260 is connected to the collector of transistor 256 so that lamp 260 lights when transistor 256 turns "On" thus indicating visually on panel 28 that the separation distance between electromagnets 34 and 56 is not a "standard" distance. Since one input to gate 254 is connected to the output of blink source circuit 258, lamp 260 will flash on and off when gate 262 is "On".

Blink source circuit 258 has an inverter 262 with its output connected to the input of another inverter 264. A capacitor 266 and a resistor 268 are connected in series with the capacitor 266 connected to the output of inverter 264 and the resistor 268 connected to the input of inverter 262. A resistor 270 is connected between the output of inverter 262 and the interconnection between resistor 268 and capacitor 266. An output signal for blink source circuit 258 occurs at the output of inverter 264 and which is a square wave for flashing indicator and warning lights at a rate of approximately two flashes per second. The output of blink source circuit 258 is connected to the circuit nodes shown in FIG. 9 with a small triangle.

The standard magnet separation detection system circuit 272 is connected by leads 274, 276, 278 and 280 to the inputs of NAND gate 282. NAND gate 282 is "off" unless the light sensors 152, 154, 156 and 158 (see FIG. 4) detect that the upper electromagnet 56 is at a "standard" vertical position. The output of gate 282 is connected to an input of NOR gate 252 and to the non-inverting input of flip-flop 284 to allow operation of degausser 20 on a manual override basis at the option of the user when upper electromagnet 56 is not at a "standard" vertical position. In practice, the flashing of lamp 260 indicates to the user of degausser 20 that the upper electromagnet 56 is not at a "standard" vertical position and that switch 286 must be depressed in order to cause tray 104 to move and the electromagnets 34 and 56 to generate an erasing magnet field. Switch 286 represents a push button switch mounted on panel 28.

Lid safety switch 290 is connected to pull down an input to NAND gate 292 which is connected through a resistor 294. Switch 290 corresponds to switch 148 in FIG. 3 and serves to prevent operation of degausser 20 when the cover 30 is not in place. NAND gate 292 has its output connected through resistor 296 to control the initiation of timer 226. Switch 290 is connected to close when the cover 30 is not in place and thus acts to turn on the light emitting diodes 298 corresponding to two of the light sources 172 on panel 28 and to indicate to the operator of degausser 20 that the cover 30 must be mounted.

Gate 292 has an input connected to the output of gate 246. The function of gate 292 is to trigger timer 226 when all of the inputs to gate 292 are "on" and when the output of gate 246 has momentarily gone "on".

Stop switch 300 is connected through capacitor 302 to an input of NAND gate 304. Resistors 306 and 308 are connected between power supply 212 and opposite sides of capacitor 302 so that gate 304 is caused to momentarily go "on" when switch 300 closes. Switch 300 corresponds to the switch 138 shown in FIG. 3 and serves to stop movement of tape tray 104 when tray 104 reaches its full forward travel out from between electromagnets 34 and 56. The output of gate 304 is connected to set the input of flip-flop 284 and is connected through inverter 306 to the reset input of timer 226. Since the inverted output of flip-flop 284 is connected to an input of gate 252, flip-flop 284 allows switch 286 to permit operation of degausser 20 when upper electromagnet 56 is not at a standard vertical position, and switch 300 acts to reset the flip-flop 284 at each time that tray 104 has completed its sliding cycle so that the standard circuit 272 will be checked again by gate 282.

Photoreflective sensor 308 is connected through resistor 310 to power supply 212 and corresponds to sensor 134 shown in FIG. 7. Sensor 308 is preferably the commercially available type of component consisting of a light emitting diode mounted alongside a photo-darlington transistor so that optically reflective objects placed in front of sensor 308 to be adjusted.

The output of sensor 308 is connected to an input of NAND gate 312 through an inverter 314. The output of NAND gate 312 is connected to the reset input of flip-flop 228. Thus, a reflection change detected by sensor 308 will cause motor control circuit 214 to be activated so that tray 104 is pulled away from between electromagnet 34 and 56. The output of inverter 314 is connected to the set input of flip-flop 316 through an inverter 318. AND gate 320 has its inputs connected to the non-inverted output of flip-flop 316 and to the output of blink source circuit 258; so that light emitting diodes 322 will be activated through transistor 324 to flash after sensor 308 has detected a change in reflectance. Diodes 322 correspond to two of the light sources 172 on panel 28 and serve to indicate to the user of degausser 20 that a magnetic tape container (not shown) has struck pivoting flap 136 (see FIG. 3) and therefore that upper electromagnet 56 is positioned too low.

The inverted output of flip-flop 316 is connected to an input of gate 292 so that timer 226 is inhibited from being activated after sensor 308 has detected a change in reflectance.

Temperature sensing diode 326 has its cathode connected to power supply 212 and its anode connected to the non-inverting input of flip-flop 328 through a resistor 330. The anode of diode 326 is connected to ground through an adjustable resistor 332 which is adjustable to allow the temperature sensitivity of diode 326 to be varied. Diode 326 is of the commercially available type which breaks down and allows reverse current flow at elevated temperatures. Diode 326 represents a diode which is to be mounted in physical contact with the core 40 of lower electromagnet 34. The function of diode 326 is to monitor the temperature of core 40 so that operation of degausser 20 can be electrically prevented when electromagnet 34 is overheated. Thus, diode 326 provides an overheating detection safety feature to protect degausser 20 from damage.

NOR gate 334 has its input connected to the inverted output of flip-flop 328 and to the output of blink source circuit 258; so that light emitting diodes 336 will be activated through transistor 338 to flash after diode 326 has detected that the core 40 is too hot. Diodes 336 correspond to two of the light sources 172 on panel 28 and serve to indicate to the user of degausser 20 that degausser 20 is overheated and must be allowed to cool off before use. The inverted output of flip-flop 328 is also connected to an input of gate 292 to inhibit the starting of timer 226 when core 40 is overheated. Thus, overheating of diode 326 will inhibit the initiation of a demagnetizing cycle of degausser 20 but will not stop degausser 20 once a cycle has started.

NOR gate 320 has its output connected to the inverting input of flip-flop 328 and has its inputs connected together through capacitor 342 to ground. The inputs of gate 340 are also connected through a parallel resistor 344 and diodes 346 to the output of timer 226. The function of gate 340 is to make flip-flop 328 insensitive to the condition of diode 326 for a period of time after timer 226 has shut "off". This time period is determined by the size of resistor 344 and capacitor 342, and insures that the condition of diode 326 is not affected by magnetic fields from electromagnets 34 and 56 which cease after timer 226 shuts "off".

Switch 348 corresponds to switch 140 (see FIG. 3) and is connected between ground and the anode of diode 350. Resistor 352 is connected in parallel with diode 350. Resistor 254 is connected between the anode of diode 350 and power supply 212. Capacitor 356 is connected between the cathode of diode 350 and power supply 212. Resistor 358 connects the cathode of diode 350 to an input of gate 312 and the anode of diode 360. Push button switch 362 corresponds between ground and the cathode of diode 360 which is connected to an input of NAND gate 364.

The function of gate 312 is to cause the motor control circuit 214 to be activated to pull tape tray 104 away from the electromagnets 34 and 56 when: the switch 348 senses that tray 104 and carriage 110 are fully between the electromagnets 34 and 56, or the switch 362 has been depressed by the operator of degausser 20 to reverse the motion of tape tray 104, or sensor 308 has detected that a magnetic tape container (not shown) is vertically too high and risks making damaging contact with the upper electromagnet 56.

The function of capacitor 356 and resistor 352 is to provide a time delay soaking period between the time that switch 348 senses that tray 104 is between electromagnets 34 and 56, and the time that gate 312 changes state to cause tray 104 to be pulled away from the electromagnets 34 and 56. This soaking period is important to insure that magnetic tapes (not shown) on tray 104 are completely and uniformly erased by maintaining tray 104 between electromagnets 34 and 56 for a period of time while tray 104 is rotating. It is preferable to insure that the sizes of capacitor 356 and resistor 352 are chosen so that the tray 104 makes approximately one and one-half revolutions when tray 104 is between electromagnet 34 and 56 and switch 140 is contacted by carriage 110. The tray 104 should preferably make a non-whole number of revolutions while stopped from moving horizontally when between electromagnets 34 and 56 so that non-uniformities in magnetic erasing do not result.

The output of gate 364 is connected to the reset inputs of flip-flops 316 and 328. Flip-flops 316 and 328 are reset by gate 364 when push-button 362 is depressed or when power supply 212 has become active and capacitor 366 has not had time to charge up. Capacitor 366 is connected between ground and inputs to gates 304 and 364. Resistor 368 is connected between power supply 212 and capacitor 366. Gate 304 serves to set flip-flop 284 and reset timer 226 when power supply 212 has become active and capacitor 366 has not had time to charge up.

Figure 10:
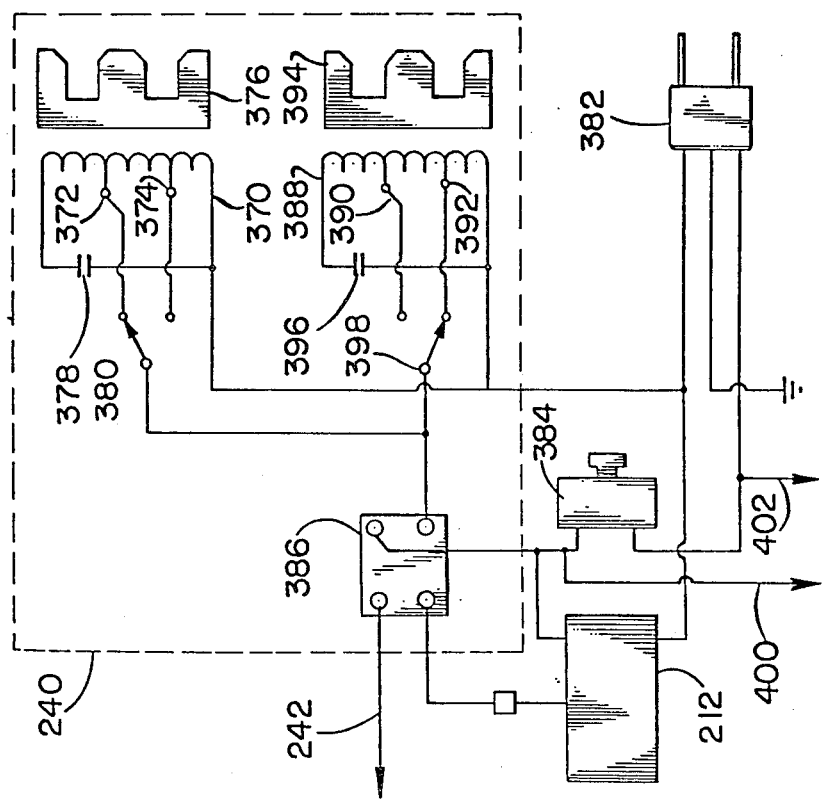
FIG. 10 is an electrical schematic circuit diagram of the electromagnet drive circuitry of this invention.

Referring next to FIG. 10, electromagnet drive circuit 240 has an upper winding 370 with taps 372 and 374. Winding 370 corresponds to upper electromagnet winding coil 76 (see FIG. 2). Core 376 is magnetically coupled to winding 370 and corresponds to upper electromagnet core 58 (see FIG. 2). Capacitor 378 is connected across winding 370 to form an inductance capacitance tank circuit which is approximately resonant at the frequency of the electrical power applied (preferably sixty Hertz). The function of the capacitor 378 is to minimize the electrical power required to drive the winding 370 and to allow winding 370 to "ring" in a damped electrical oscillation which insures that no large discontinuities, glitches, or spikes are produced in magnetic tapes being erased by degausser 20.

Switch 380 is connected to the power plug 382 through a circuit breaker 384 and an optically coupled, solid-state relay 386. The function of switch 380 is to select between center taps 372 and 374 so as to select the amount of magnetic power produced in core 376. The center taps 372 and 374 allow the winding 370 to behave as an auto-transformer so as to minimize the voltage level required to drive the winding 370 and produce a large voltage across capacitor 378.

Winding 388 is similar to winding 370, has center taps 390 and 392, and corresponds to lower electromagnet coil winding 36. Core 394 is similar to core 376, is magnetically coupled to winding 388, and corresponds to lower electromagnet core 40. Capacitor 396 is similar to capacitor 378 and is connected across winding 388. Switch 398 is similar to switch 380 and is connected to relay 386 to select between taps 390 and 392. Core 394, winding 388, capacitor 396 and switch 398 function and cooperate together in the same way as core 376, winding 370, capacitor 378, and switch 380.

It is desirable that the power flowing through windings 370 and 388 be separately adjustable through switches 380 and 398 so that magnetic tape containers (not shown) having magnetic parts, such as tape reels having metal hubs, can be conveniently processed by placing switch 398 to the high power tap 392 and by placing switch 390 to the lower power tap 372 so that the magnetic tape container (not shown) is held against disk 108 and is prevented from flying upwards to destructively contact upper electromagnet 56.

Relay 386 is controlled by lead 242 to connect switches 380 and 398 with the power plug 382 through circuit breaker 384. Power plug 382 is to be connected to a standard wall socket source of alternating current power. Power supply 212 is also supplied with power through plug 382 and circuit breaker 384. Leads 400 and 402 are a source of alternating current electrical power protected by circuit breaker 384.

Figure 11:
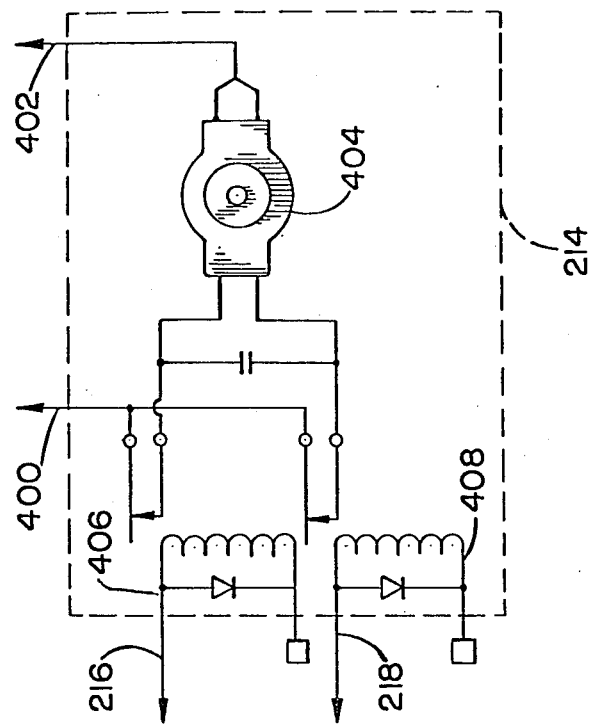
FIG. 11 is an electrical schematic circuit diagram of the tray rotation and translation control circuitry of this invention.

Referring next to FIG. 11, motor 404 is an alternating current, reversible electric motor corresponding to the motor 120 shown in FIG. 2. Motor 404 has a common winding connection made to power lead 402 and has directional winding lead connections make through electromagnetic relays 406 and 408 to power lead 400.

Leads 216 and 218 control the activation of relays 406 and 408, respectively, so as to control the direction of rotation of motor 404.

Figure 12:
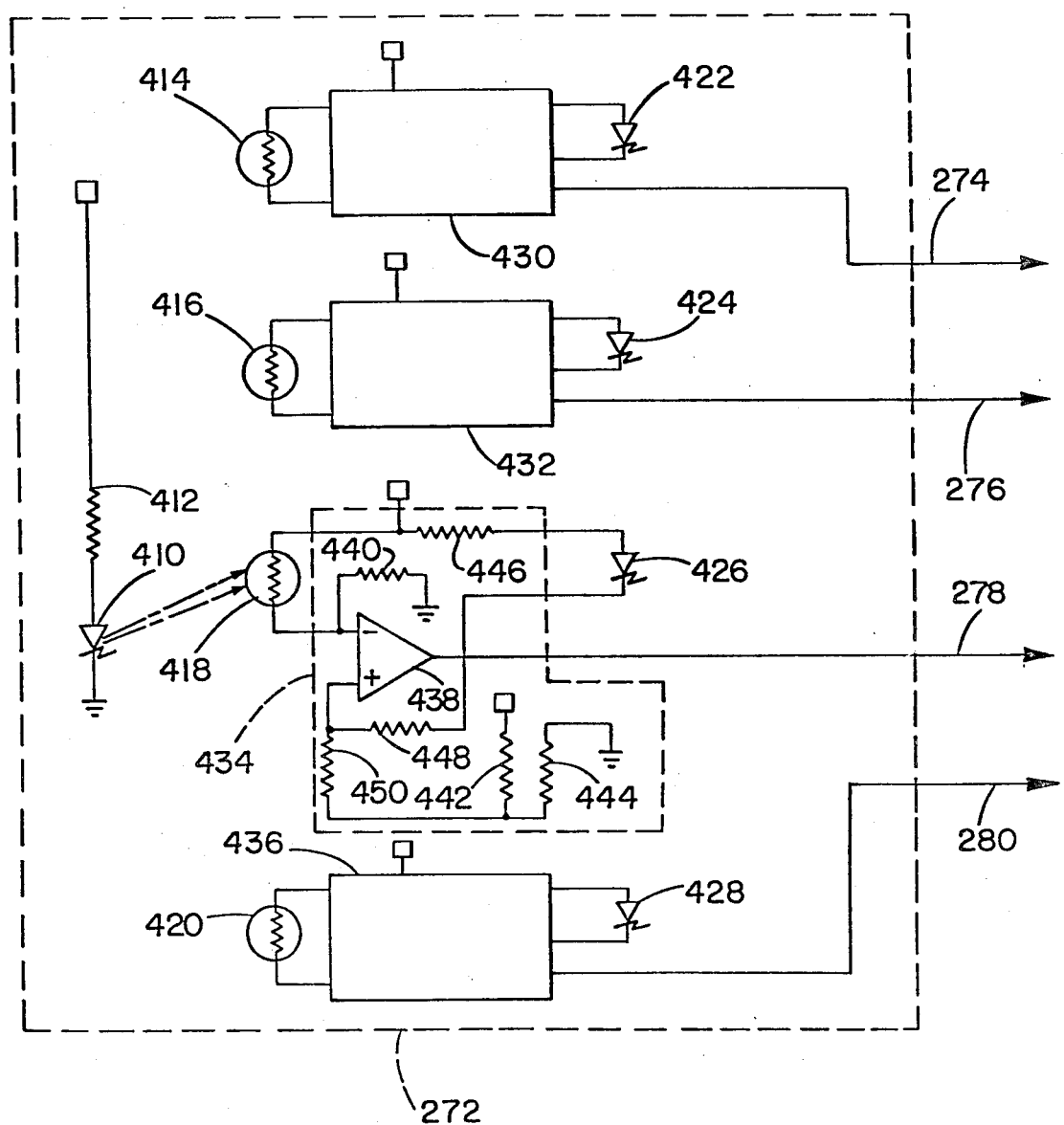
FIG. 12 is an electrical schematic circuit diagram of the standard magnet separation detection circuitry of this invention.

Referring next to FIG. 12, light emitting diode 410 is connected between ground and the power supply 212 through resistor 412. Diode 410 corresponds to the light source 150 shown in FIG. 4. Light sensitive resistors 414, 416, 418 and 420 correspond to the light sensors 152, 154, 156 and 158, respectively, shown in FIG. 4. Light emitting diodes 422, 424, 426 and 428 correspond to light sources 170 (see FIG. 5).

Detection circuitry 434 has the same construction as and is functionally similar to detection circuitry 430, 432 and 436. Circuitry 434 is connected to resistor 418 to sense when light falls on resistor 418, and to produce an output on lead 278 and light diode 426 when light falls on resistor 418. Integrated circuit comparator 438 is connected to compare the voltage across resistors 418 and 440 with the voltage across resistors 422 and 444. When light is detected by resistor 418, comparator 438 turns "off" so that diode 426 is lit by power through resistor 446, and so that the voltage on lead 278 decreases. The function of resistors 448 and 450 is to set the gain of comparator 438.

Circuitry 430 is connected to resistor 414 and controls the voltage on lead 274 and the lighting of diode 422. Circuitry 432 is connected to resistor 416 and controls the voltage on lead 276 and the lighting of diode 424. Circuitry 436 is connected to resistor 420 and controls the voltage on lead 280 and the lighting of diode 428.

Improvements

The following description relates to improvements made to the tape degaussing machine and method described above.

Figure 13:
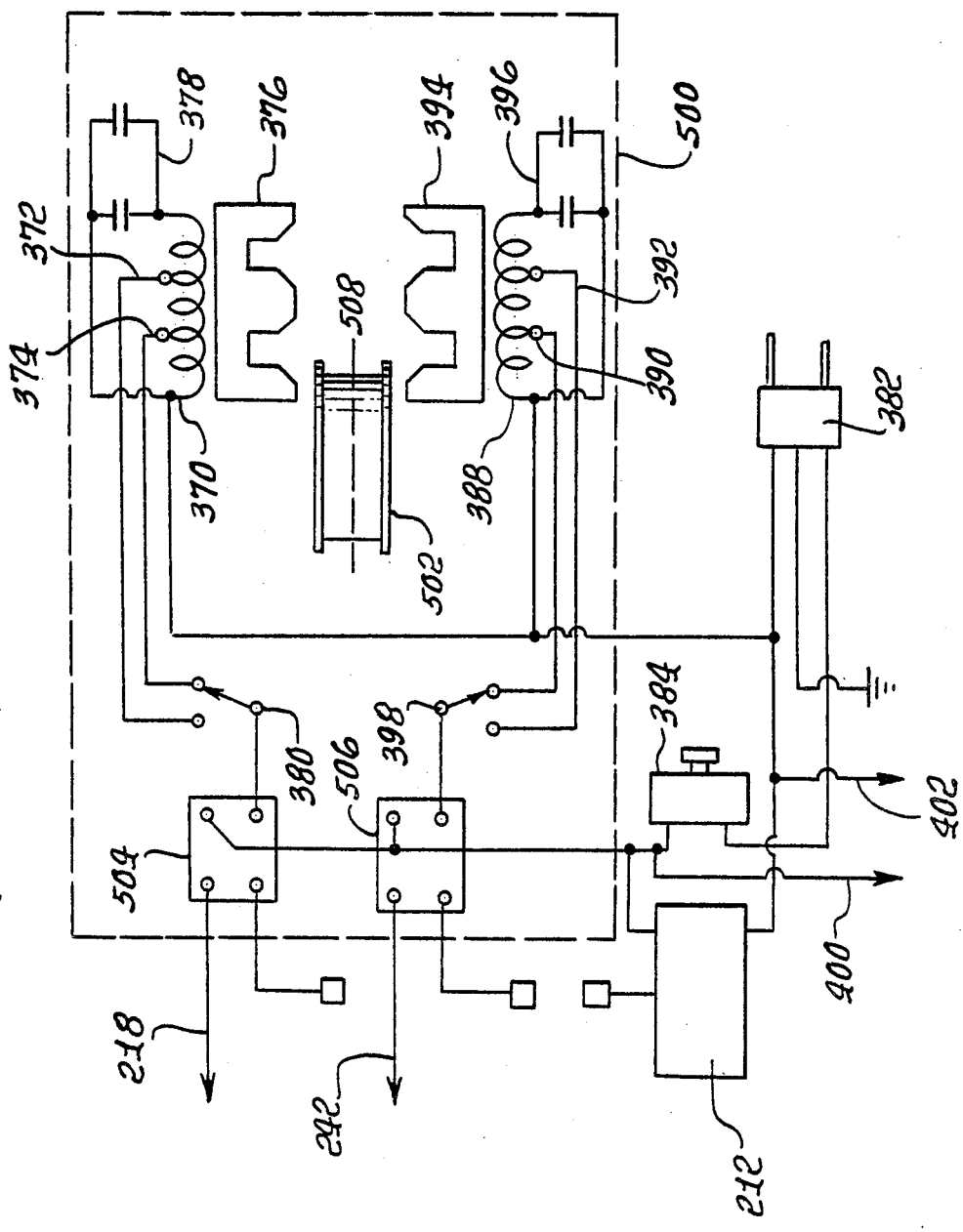
FIG. 13 is an electrical schematic diagram of improved electromagnet drive circuitry of this invention.

Referring to FIG. 13, electromagnet drive circuitry 500 is shown for separately controlling the upper and lower electromagnets of the magnetic tape degaussing machine 20. The circuitry shown in FIG. 13 is similar to that shown in FIG. 10, excepting that separate controls are provided for the upper and lower electromagnets and a more illustrative showing is made of a tape reel 502 in proximity with the upper and lower electromagnet cores 376 and 394.

Solid state relays 504 and 506 are provided to separately control the upper electromagnet winding 370 and lower electromagnet winding 388, respectively. In the preferred version of the invention shown in FIG. 13, the relay 504 is connected to be actuated under the control of the line 218 (see FIG. 9) which ensures that the upper electromagnet winding 370 is only actuated when the tape 502 is withdrawn from between the electromagnet cores 376 and 394. The solid state relay 506 is connected to be actuated by the line 242 (see FIG. 9) so that the lower electromagnet winding 388 is actuated during the time that the tape 502 is transported towards, maintained between, and conveyed away from the electromagnet cores 376 and 394. The preferred arrangement shown in FIG. 13 thus ensures that the lower electromagnet coil 388 is producing magnetic flux continously during the operation of the magnetic tape degausser 20, and that the upper electromagnet coil 370 is caused to produce flux only when the magnetic tape 502 is withdrawn from between the electromagnet cores 376 and 394. The position of the magnetic tape 502 is sensed by the circuitry of FIG. 9 which responds to actuation of microswitch 140 (see FIG. 3) as described above. This separate operation of the electromagnet coils 370 and 388 is important to provide for uniform, residual noise-free erasure of the magnetic tape 502. Improved erasure of the magnetic tape 502 results from the fact that when both coils 370 and 388 are actuated, a strong vertical field is produced which, because of the characteristics of the magnetic tape 502, has its least effective erasing performance along a band in the center of the width of the magnetic recording tape 502, approximately in a plane identified by the dashed line 508. The magnetic tape 502 is shown, in side view, as a long strip of plastic tape which is wound on a circular tape reel. The magnetic tape 502 may be tape intended for audio, video, or computer data recording uses, and the magnetic tape degausser 20 may find particular application in erasing information recorded on multi-track audio tapes. For such multi-track audio tapes, audio information is recorded on tracks which extend along the length of the tape strip and which are arranged in a parallel fashion across the width of the tape strip. For such multi-track audio tapes, one of the audio-recording tracks may be positioned in the same place as the dotted line 508. If both electromagnet coils 370 and 388 are operated together, such an audio-recording track located on the line 508 may not be totally erased and a relatively large amount of residual noise may be left in the magnetic tape 502 after operation of the degaussing machine 20.

The circuitry shown in FIG. 13 corrects the problem of separately actuating the electromagnet coil 388 prior to actuation of the coil 370, so that the region in the line 508 is exposed to a strong flux pattern produced by the coil 388 and which is uninfluenced by operation of the coil 370. The separate operation of the lower electromagnet coil 388 followed by combined operation of the upper and lower coils 370 and 388 provides a uniform erasure of the magnetic tape 502 which does not have the undesired reduced erasing effectiveness along the line 508. The improved erasing effectiveness provided by the circuitry shown in FIG. 13 results from the fact that the actuation of coil 388 alone provides a different magnetic flux pattern than is provided by actuation of coils 388 and 370 together. A similar effect can be achieved by actuation of coil 370 alone followed by actuation of coils 370 and 388 together, excepting that a greater tendency to lift the tapes will be produced.

The magnetic recording tape 502 often is provided in the form of a long strip of plastic recording tape wound upon a metal tape reel. Because of the effect of eddy currents when such a metal tape reel is placed between the electromagnet cores 376 and 394 when flux is occurring between the cores, the metal tape reel will itself be heated and rise in temperature. In order to adequately erase the magnetic tape 502, it is desirable to produce a large amount of flux between the upper and lower electromagnet cores 376 and 394; however, the production of such large amounts of flux contributes to the undesired heating of the metal tape reel used for the magnetic tape 502. The electromagnet control circuitry 500 helps to reduce this heating by reducing the time during which the magnetic tape 502 is exposed to the full amount of flux flowing between the cores 376 and 394. That is, a lesser rate of heating is produced by actuating only the lower electromagnet core 388 than is produced by actuating both upper electromagnet coil 370 and lower electromagnet coil 388.

An alternative improved version of the electromagnetic degaussing machine 20 can be produced by connecting the solid state relay 506 shown in FIG. 13 to be actuated by line 218 rather than line 242. Such a connection would cause both the upper and lower electromagnet cores 370 and 388, respectively, to be actuated only as the magnetic tape 502 is withdrawn from between the electromagnet cores 376 and 394. Such operation would reduce the heating of the metal reel of the magnetic tape 502 by reducing the time during which the magnetic tape 502 is exposed to the magnetic flux produced between the cores 376 and 394. The amount of heating produced in such an alternative improved version can be expected to be less than the amount of heating produced by the circuit arrangement shown in FIG. 13, but would not produce the improved, highly uniform erasure provided by the circuit arrangement of FIG. 13. The alternative improved erasing circuitry would cause both the upper and lower electromagnet coils 370 and 388 to remain off as the magnetic tape 502 is conveyed towards the cores 376 and 394, and would simultaneously actuate both the upper and lower electromagnet cores 370 and 388 as the magnetic tape 502 is withdrawn from between the cores 376 and 394.

The relationship illustrated in FIG. 13 between the magnetic tape 502 and the electromagnet cores 376 and 394 is not strictly accurate, as can be seen by closely examining FIG. 3. The "E"- shaped cores 376 and 394 are shown in a side-view in FIG. 13 to allow for convenient conceptual discussion, but more accurately, should be shown from an end-on view.

Improved erasing performance may be obtained using the electromagnet control circuitry 240 shown in FIG. 10 by using a technique which increases the amount of time required, and manual effort required, in erasing a magnetic tape. This improved technique using the circuitry of FIG. 10 would proceed by positioning the switch 398 to select the high-power tap 392 for the lower electromagnet coil 388, and by positioning the tap 380 to connect the low-power tap 372 of the upper electromagnet coil 370, so that both the upper and lower coils 370 and 388 would be operated together simultaneously, but so that less magnetic flux would be produced in the upper core 376 than in the lower core 394. The effect of such operation with the circuitry of FIG. 10 would be to produce an area of lessened erasing effectiveness similar to the area 508 discussed in conjunction with FIG. 13, but which was displaced vertically upwards from the plane 508 shown in FIG. 13. The way that such an improved technique could be used with the circuitry of FIG. 10 is that a magnetic recording tape to be erased could be cycled in and out of the degaussing machine 20, flipped vertically over, and again cycled in and out of the degaussing machine 20, thus using two passes in order to erase the magnetic tape. Such a technique of using two passes but flipping the magnetic tape vertically over between the passes is to ensure adequate erasure without large residual noise. The reason that setting the upper and lower electromagnets at different power levels, and flipping the magnetic tape over between passes provides such improved performance is that because the region of reduced erasing effectiveness does not extend through the center of the width of the magnetic tape, the region of reduced erasing effectiveness left after the first pass will be effectively erased during the second pass, and the region of reduced erasing effectiveness during the second pass will have already been effectively erased during the first pass. Although such a technique using two passes does require more time and may produce more heating of a metallic tape reel, effective, uniform erasure is produced which may be substantially advantageous for critical applications such as the erasure of multi-track audio tapes. Alternatively, the same approach could be used to set the upper coil 370 to high-power and the lower coil 388 to low-power in order to improve erasure using a two-pass technique; however, a greater tendency of the tape degausser 20 to lift tapes upward would be expected.

As shown in FIG. 10, the "hot" side of the supply line extending through plug 382 in FIG. 13 is labeled 400. The line 400 in FIG. 13 may be connected to the line 400 shown in FIG. 11 so as to supply the AC motor 404 shown in that figure. Alternatively, the line 400 of FIG. 13 may be connected to the line 400 of FIG. 14 (and line 400 of FIG. 17) in order to allow the AC motor 404 to be driven at a controlled speed, or line 400 of FIG. 13 may be connected to line 400 of FIG. 17 in order to allow a DC motor to be driven at a controlled speed.

Figure 14:
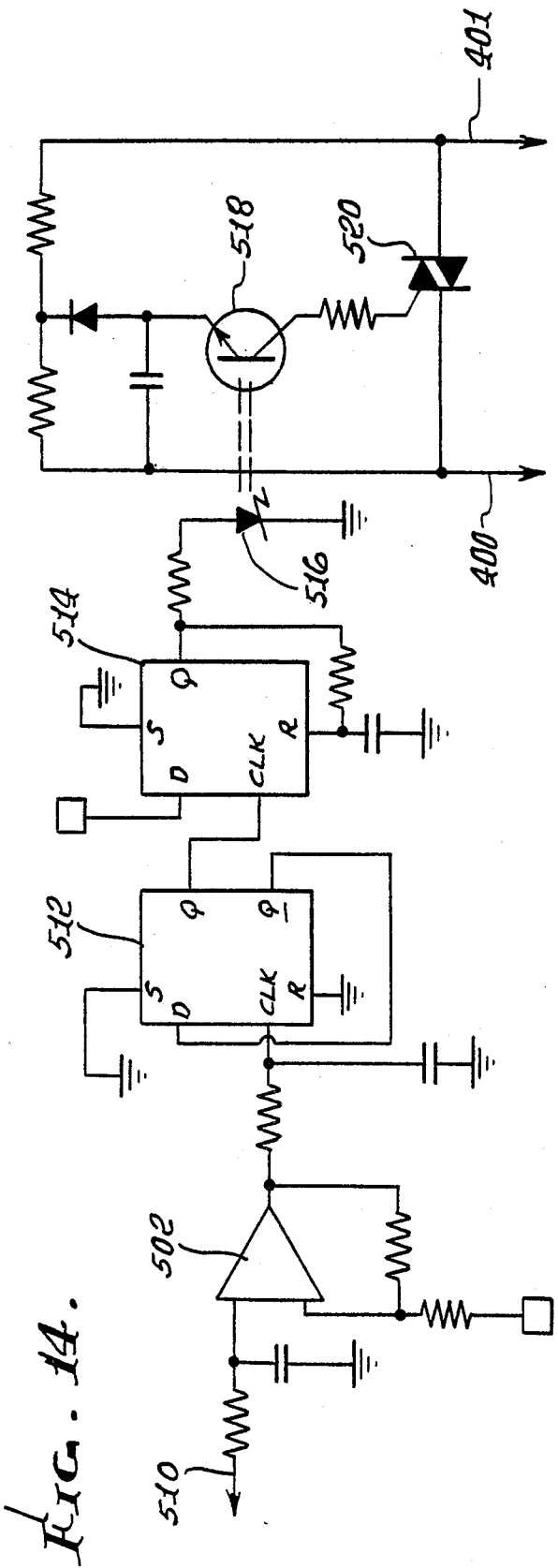
FIG. 14 is an electrical schematic diagram of improved AC circuitry for use with the tray rotation and translation control circuitry of this invention.

Referring next to FIG. 14, circuitry is shown which may be used to control the speed of the AC motor 404 shown in FIG. 11. An operational amplifier comparator 508 is connected to a low voltage secondary of a transformer (not shown) through the lead 210 in order to produce a square wave signal responsive to the power line wave form at plug 382 (see FIG. 10 or 13) and as shown by the wave form of FIG. 15 (a sine wave). The output of the comparator 508 is connected to flip-flop 512, which is configured as a "divide by 2", which serves to allow only every other pulse to pass from comparator 508 to monostable multivibrator 514. The comparator 508 is preferrably made from a commercially available type 748C operational amplifier. Both the flip-flop 512 and the monostable 514 are preferrably parts of a commercially available type 4013 dual D-type flip-flop. The output of the monostable 514 is connected to drive light emitting diode 516, which is preferrably a portion of a commercially available optical isolator type 4N29. The light emitting diode 516 is optically coupled to a light detecting transistor 518, both of which are parts of the optical isolator, which provides for electrical isolation between the logical portions of the circuitry for the degaussing machine 20 and the power portions of the circuitry. The transistor 518 is used to control the triggering of a thyristor triac 520, which is connected to control the supply of power to the AC motor 404 shown in FIG. 17.

Figure 16:
FIGS. 15 and 16 are amplitude versus time waveforms for voltages present in the circuitry of FIG. 14.
Figure 15:
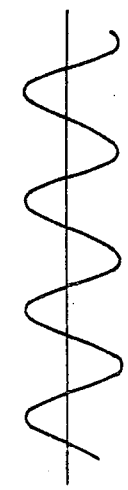

The underlying basis for the operation of the circuitry of FIG. 14 is that the motor 404 of FIG. 17 is an AC-synchronous motor, the speed of which is determined to a great extent by the frequency of AC power supplied. The circuitry of FIG. 14 is used to selectively vary the speed of the motor 404 by providing AC pulses which will cause the motor 404 to rotate at approximately one-half of its nominal speed when the tray 104 is moved in reverse. The waveform at FIG. 15 illustrates a 60 hertz sine wave having the shape of the power signal sensed at the line 510 by the circuitry of FIG. 14. The wave form of FIG. 16 shows an interrupted sine wave produced for the AC motor 404 by the action of the triac 520, and which effectively has a lower frequency than the waveform of FIG. 15. When the wave form of FIG. 16 is applied to the synchronous AC motor 404, the speed of the motor 404 is approximately one-half the speed that the motor 404 would produce when provided with power having a wave form shown as in FIG. 15.

The purpose of the circuitry of FIG. 14 is to reduce the speed of the motor 404 so as to increase the erasing effectiveness of the magnetic tape degausser 20. Reduction of the speed of the motor 404 causes the rate of rotation of the tray 104 to decrease, and the rate of horizontal translation of the tray 104 to decrease. It has been found that erasing effectiveness very much depends on the relative rate of movement between the tape to be erased (see tape 502 in FIG. 13) and the magnetic flux produced by the erasing cores 376 and 394. The relative rate of movement described above is a factor when combined with the time frequency of the erasing magnetic field which serves to determine the nature of the residual magnetism left in the magnetic tapes after erasure in the magnetic tape degausser 20.

Because of the fact that the tray 104 both rotates and translates in its motion, the path of the projection of magnetic flux onto the tray 104 by the magnetic cores 376 and 394 forms a generally spiral shaped pattern in a horizontal plane. It has been found that with the use of an erasing magnetic field having a time frequency of 60 Hertz, good erasure can be obtained with relative rates of movement (between the tray 104 and the cores 376 and 394) of less than approximately 0.1 inch/second. The time required for the degausser 20 to complete a cycle (i.e., to move the tray 104 from its rest position, to between the cores 376 and 394, and back to its rest position) takes approximately 30 seconds in the embodiment shown in FIGS. 10 and 11. When the circuitry of FIGS. 14 and 17 is used, the time taken for cycling the degausser 20 is approximately 50 seconds. The capacitor 236 in FIG. 9 must be changed in size to accommodate the longer cycling time.

Referring next to FIG. 17, the motor wiring for use with the circuitry of FIG. 14 to control the speed of AC motor 404 is shown. The circuitry of FIG. 17 is very similar to that of FIG. 11, excepting that the motor 404 is provided with interrupted AC pulses (as in FIG. 16) from the lead 401 when the coil 408 is actuated to cause motor 404 to rotate in reverse. Motor 404 is provided with a complete AC sine wave (as in FIG. 15) when coil 406 is actuated to cause motor 405 to rotate in a forward direction. Therefore, the wiring of FIG. 17 and the thyristor circuitry of FIG. 14 causes the AC motor 404 to rotate forward at full speed until the tape 502 is between cores 376 and 394, and then to rotate in reverse at approximately half speed as the tape 502 is withdrawn from between the cores 376 and 394.

Referring next to FIG. 18, the translation speeds provided by the circuitry of FIGS. 14 and 17 vary with time as shown for the time that tape 502 is moved forward towards cores 376 and 394, as the tape 502 is held stationary (no translation-but rotation occurs) between cores 376 and 394, and as the tape 502 is moved in reverse from between cores 376 and 394. The speed profile shown by FIG. 18 is an important result produced by the circuitry of FIGS. 14 and 17 since the forward speed is high to quickly get the tape 502 to the cores 376 and 394 where erasing may occur, since a stationary time (wherein tape 502 rotates without translation) is provided for tape 502 between cores 376 and 394 to insure complete erasure, and since a reduced reverse speed is provided to withdraw tape 502 from cores 376 and 394 and which results in a reduced relative rate of movement (between the tray 104 and cores 376 and 394) and ensures good erasing effectiveness as discussed above.

Figure 19:
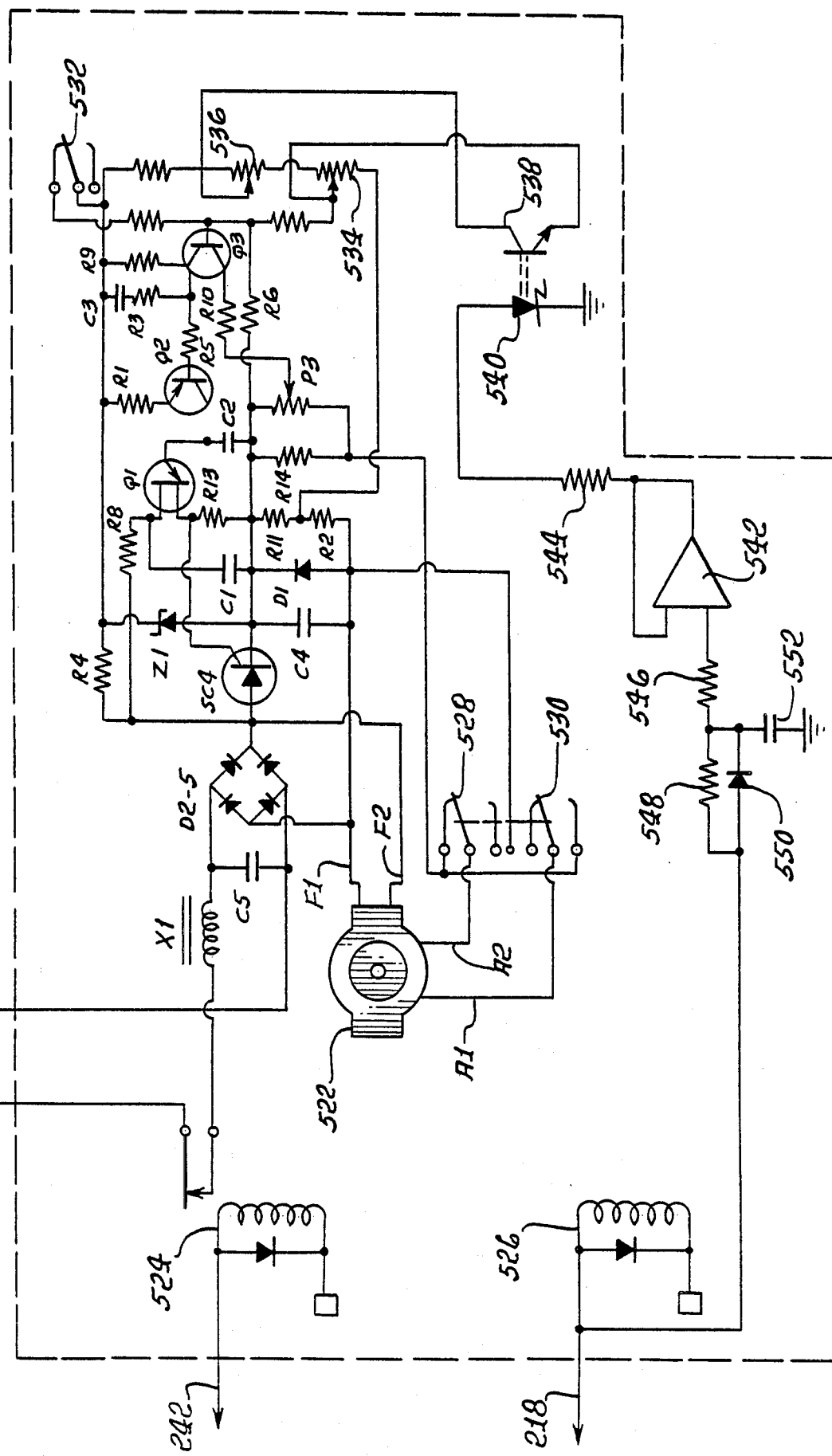
FIG. 19 is an electrical schematic diagram of improved DC circuitry for use in controlling tray translation and rotation in this invention.

Referring next to FIG. 19, circuitry for controlling the speed of a direct current motor 522 is shown.

The direct current motor 522 is mechanically equivalent to the AC motor 404 shown in FIGS. 11 and 17 but is constructed to run on DC power rather than AC power. The purpose of the circuitry shown in FIG. 19 is to vary the speed of the DC motor 522 by varying the DC voltages provided to the motor 522. The use of a DC motor 522 is advantageous in that the control of DC voltage levels is comparatively simple and a smooth running DC motor 522 can be used to provide smooth motion of the tray 104 at many various speeds. The use of a DC motor 522 in the place of an AC motor 404 has a further advantage in that it has been experimentally noticed that the use of an AC motor in proximity to the cores 376 and 394 during the erasing of a magnetic tape 502 may cause the magnetic tape 502 to be imprinted with a residual AC noise due to operation of the AC motor 404. The use of a DC motor 522 does not produce such AC residual noise in the magnetic tape 502, inasmuch as the DC motor 522 is not provided with AC noise producing power. The circuitry of FIG. 19 may be used in conjunction with the circuitry of FIG. 13 so that both the speed of withdrawal of tape 502 is controlled, and the magnetic field provided to tape 502 is controlled.

The circuitry shown in FIG. 19 is a modification and enhancement of commercially available motor control circuitry provided by the Minarik Electric Company of 232 E. Fourth St., Los Angeles, Calif., 90013 and which is called the Model No. SL15U. The following table lists those components common to both the prior Minarik design and the design shown in FIG. 19:

| Component Number | Description |
| --- | --- |
| C1 | 0.02 mfd. |
| C2 | 0.15 mfd. |
| C3 | 50 mfd. |
| C4 | 50 mfd. |
| C5 | 0.1 mfd. |
| D1 | IN4003 diode |
| D2-5 | IN4003 diode |
| P3 | 100 ohm |
| Q1 | 2N2646 unijunction transistor |
| Q2 | 2N5354 |
| Q3 | 2N2923 |
| R1 | 1000 ohm |
| R2 | 22K ohm |
| R3 | 470 ohm |
| R4 | 10k ohm |
| R5, 6 | 5600 ohm |
| R8, 9 | 33k ohm |
| R10, 11 | 820 ohm |
| R12 | 15 ohm |

In FIG. 19, the field coil connections for the DC motor 522 are labeled F1 and F2. The armature winding connections for DC motor 522 are labeled A1 and A2. The diodes D2–5 are connected to provide a constant DC voltage across the field windings F1 and F2. The circuitry shown in FIG. 19 serves to vary the armature voltage applied across the winding connections A1 and A2 in order to vary the speed of a direction of rotation of the DC motor 522.

A relay 524 is connected to the line 242 so that power is provided to the circuitry of FIG. 19 when the motor 522 is to be rotated in either a forward or reverse direction. A relay 526 is connected to the line 218 in order to select between forward and reverse rotation for the motor 522. The relay elements 528, 530, and 532 are magnetically connected to the relay 526 so that the direction of rotation of the motor 522 is selectively controlled. The purpose of the relay elements 528 and 530 is to reverse the polarity of the voltage provided to the armature windings A1 and A2 when the motor 522 is to rotate in a reverse direction in order to move the magnetic tape 502 away from the erasing magnet cores 376 and 394. The position of the magnetic tape 502 is sensed by the circuitry of FIG. 9 which responds to actuation of microswitch 140 (see FIG. 3) as described above. The relay element 532 acts to provide a constant, full speed voltage to the armature connections A1 and A2 during the time that the motor 522 is to rotate in a forward direction. The circuitry of FIG. 19 is essentially a switching voltage regulator in which the silicon controlled rectifier (labeled SCR) is connected to the unijunction transistor Q1 in order to produce a pulsing voltage, the frequency of which will determine the magnitude of the voltage provided across the armature windings A1 and A2.

The potentiometer P3 acts as a torque compensator in order to keep the rotational speed of the motor 522 relatively constant as the load on the motor 522 may be changed so that the speed of the motor 522 is relatively independent of the mechanical load on the motor 522.

The potentiometers 534 and 536 serve to adjust the maximum and minimum, respectively, speeds of the motor 522 when the motor 522 is rotating in a reverse direction to pull the magnetic tape 502 away from the magnet cores 376 and 394. A phototransistor 538 is connected between the potentiometers 534 and 536 in order to control the speed of the motor 522 as the motor 522 is rotating in reverse between its maximum and minimum speeds. Transistor 538 is optically coupled to the light emitting diode 540 so that the reverse speed of motor 522 is controlled by the amount of light produced by diode 540. The transistor 538 and diode 540 are preferrably packaged together as a commercially available opto-isolator. The light emitting diode 540 is controlled in operation by the operational amplifier 542 which is connected as a voltage ramp generator. The amplifier 542 is preferably a type 741 commercially available operational amplifier and is connected to produce a signal which decreases in time after a signal is received on line 218 indicating that the motor 522 is to rotate in reverse. The amplifier 542 causes the speed of the motor 522 to gradually decrease from a maximum (as set by potentiometer 534) to a minimum speed (as set by potentiometer 536) as the tape 502 is withdrawn away from the magnet cores 376 and 394. The gradual speed reduction provided by amplifier 542 is important in order to assure complete and uniform erasure of the magnetic tape 502 by controlling the relative rate of motion of the tape 502 with respect to the magnet cores 376 and 394.

The following parts are used in producing the ramp signal in order to gradually decrease the reverse speed of the motor 522:

| Component Number | Description |
| --- | --- |
| 538, 540 | 4N27 opto-isolator |
| 544 | 2.7k ohm |
| 546 | 15k ohm |
| 548 | 1 M ohm |
| 550 | IN914 |
| 552 | 4.7 mfd. |

Figure 20:
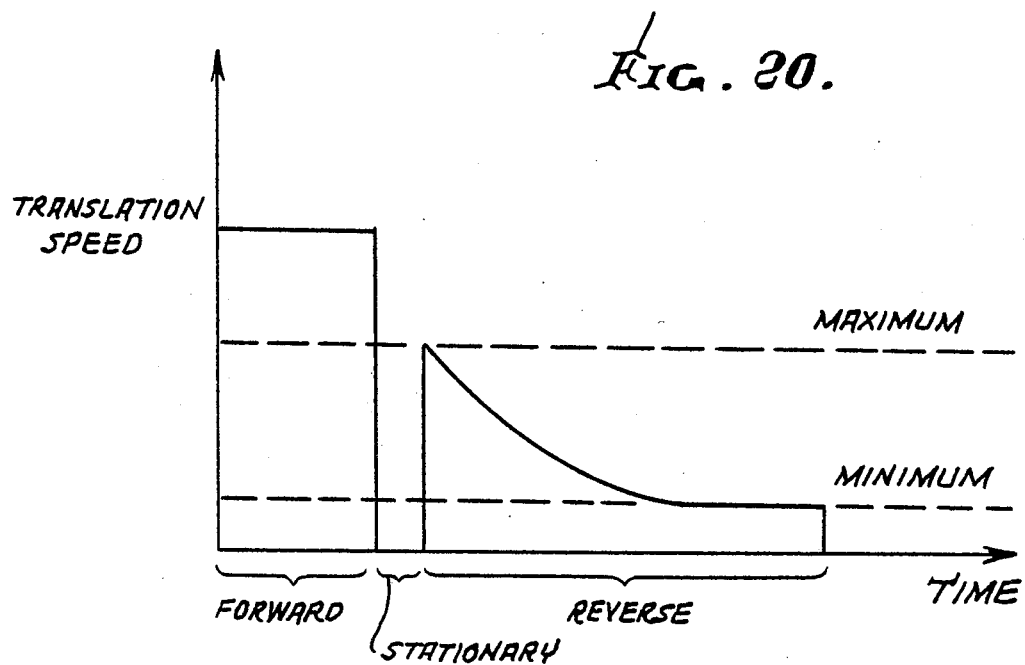
FIG. 20 is a translation speed versus time graph showing the performance produced through use of the circuitry shown in FIG. 19.

Referring next to FIG. 20 the translation speed (direction not plotted) of the tape 502 versus time for the magnetic tape degausser 20 using the circuitry of FIG. 19 is shown. A relatively higher translation speed is provided for the degausser 20 using the circuitry of FIG. 19 as the magnetic tape 502 is moved forward towards the magnet cores 376 and 394 (during time period labeled "forward"). A period of time (labeled "stationary") is provided when the magnetic tape is stationary (i.e., tape 502 rotates without translating) between the cores 376 and 394. The circuitry of FIG. 19 then causes the tape 502 to be moved in a reverse direction (during the time period labeled "reverse"), away from the magnet cores 376 and 394 and gradually decreases the translation speed of the tape 502 from a maximum to a minimum speed. This gradual variation of translation speed illustrated in FIG. 20 as produced by the circuitry of FIG. 19 may be contrasted with the relatively constant forward and reverse speeds illustrated in FIG. 18 as produced by the circuitry of FIGS. 14 and 17. The time required for the degausser 20 to complete a cycle (i.e., to move the tray 104 from its rest position, to between the cores 376 and 394, and back to its rest position) takes approximately seventy seconds. The capacitor 236 in FIG. 9 is changed in size to accommodate the longer cycle time.

Figure 21:
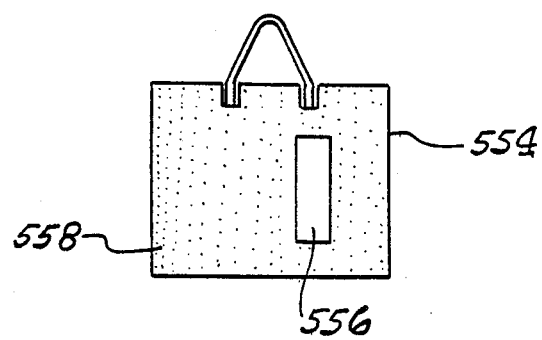
FIG. 21 is a side view of the improved tape height sensor pivoting flap of this invention.

Referring next to FIG. 21, an improved, pivoting tape sensing flap 554 similar to flap 136 in FIG. 8 is shown. Flap 554 has a white colored stripe 556 centrally located on the flap 554 and surrounded by an area 558 which is colored black to have a low optical reflectivity. The stripe 556 has a high optical reflectivity. The flap 554, stripe 556 and area 558 function analogously to the flap 136, stripe 206, and area 208 in detecting the horizontal proximity of the magnetic tape 502 to the magnet coil cores 376 and 394 in order to prevent damage.

The flap 554 has an advantage over the flap 136 in being able to sense when the magnetic tape 502 has been vertically lifted off the tray 104. Such vertical sensitivity of the flap 554 avoids damaging collisions between the tape 502 (or a tape container) and the cores 376 and 394 by automatically stopping operation of the degausser 20 as discussed above with reference to the circuitry used to optically detect the position of flap 136. The positioning of stripe 556 so that a portion of the area 558 is vertically below the stripe 556 provides vertical sensitivity since the sensor 134 may be used to detect the change in reflected light between stripe 556 and area 558 as the flap 554 is lifted vertically upwards. Such lifting of the flap 554 causes the degausser 20 to automatically stop operations in the same way as horizontal movement of the flap 554.

The flap 554 also is symmetrically shaped in order to hang straight downwards and has extended vertical edges in order to reliably detect magnetic tapes and their containers which may have projecting ridges or reels.

What is claimed is:

1. A magnetic tape degausser for erasing information encoded on a magnetic tape, said degausser comprising:
   first and second means for generating flux for erasing said magnetic tape;
   means for automatically conveying said magnetic tape towards and away from said first and second means for generating flux; and
   means for selectively actuating said first and second means for generating flux so that flux is produced only by said first means when said tape is conveyed towards said first and second means for generating flux, and so that flux is produced by both said first and second means only when said tape is proximate said first and second means for generating flux and as said tape is conveyed away from said first and second means for generating flux to a predetermined location, thereby reducing the undesired production of heat,
   said means for selectively actuating including means for sensing the location of said tape and terminating flux production when said tape is at said predetermined location away from said first and second means for generating flux.

2. The magnetic tape degausser of claim 1, wherein said means for selectively actuating includes:
   a microswitch for sensing the position of said tape relative to said means for generating flux; and
   a relay connected to said microswitch for actuating said means for generating flux when said microswitch detects that said tape is proximate said means for generating flux.

3. A method of degaussing magnetic recording tapes, comprising the steps of:
   advancing a magnetic tape towards a pair of vertically opposing electromagnets, while said magnetic tape is automatically rotated;
   controlling said electromagnets separately with only one of said electromagnets producing magnetic flux while the magnetic tape is advancing;
   withdrawing said magnetic tape between said electromagnets while said magnetic tape is automatically rotated; and
   controlling said electromagnets with both of said electromagnets producing magnetic flux while said magnetic tape is withdrawing.

4. A method of degaussing magnetic recording tapes, comprising the steps of:
   (a) advancing a magnetic tape towards a pair of opposing electromagnets;
   (b) exposing said magnetic tape to strong magnetic flux extending between said electromagnets, and arranged so that a first side of said tape receives more flux than a second side of said tape;
   (c) withdrawing said magnetic tape from between said electromagnets while said magnetic flux between said electromagnets is maintained, so that a first side of said tape receives more flux than a second side of said tape;
   (d) re-advancing said magnetic tape towards said electromagnets;
   (e) re-exposing said magnetic tape to strong magnetic flux extending between said electromagnets so that said second side of said tape receives more flux than said first side of said tape; and
   (f) re-withdrawing said magnetic tape from between said electromagnets while said magnetic flux between said electromagnets is maintained, so that said second side of said tape receives more flux than said first side of said tape.

5. The method of claim 4, wherein said electromagnets have differing amounts of flux and wherein a step of flipping said tape vertically over is provided between said steps (c) and (d).

* * * * *